United States Patent
Stewart et al.

(10) Patent No.: US 6,483,902 B1
(45) Date of Patent: Nov. 19, 2002

(54) SYSTEM AND METHOD FOR RETROFITTING EXISTING BUILDING TELECOMMUNICATIONS INFRASTRUCTURES

(75) Inventors: Brett B. Stewart, Austin, TX (US); James W. Thompson, Austin, TX (US)

(73) Assignee: Wayport, Inc., Austin, TX (US)

( * ) Notice: Subject to any disclaimer, the term of this patent is extended or adjusted under 35 U.S.C. 154(b) by 0 days.

(21) Appl. No.: 09/302,588

(22) Filed: Apr. 30, 1999

(51) Int. Cl.⁷ .............................................. H04M 11/00
(52) U.S. Cl. ................. 379/90.01; 379/93.09; 379/93.05; 379/171
(58) Field of Search .................. 379/90.01, 93.05, 379/93.09, 93.08, 93.28, 93.31, 164, 165, 167, 171, 172, 173; 370/480, 493; 375/219, 220, 222, 227

(56) References Cited

U.S. PATENT DOCUMENTS

| | | | |
|---|---|---|---|
| 4,578,540 A | | 3/1986 | Borg et al. |
| 5,010,399 A | | 4/1991 | Goodman et al. |
| 5,809,075 A | | 9/1998 | Townshend |
| 5,844,596 A | | 12/1998 | Goodman |
| 5,929,896 A | | 7/1999 | Goodman et al. |
| 5,930,312 A | | 7/1999 | Marum |
| 5,963,539 A | | 10/1999 | Webber, Jr. et al. |
| 5,963,595 A | | 10/1999 | Graham et al. |
| 5,982,741 A | | 11/1999 | Ethier |
| 5,982,784 A | * | 11/1999 | Bell ........................... 370/485 |
| 6,088,368 A | * | 7/2000 | Rubinstain et al. .......... 370/480 |
| 6,236,719 B1 | * | 5/2001 | Ahrndt et al. ............ 379/93.08 |

FOREIGN PATENT DOCUMENTS

| | | |
|---|---|---|
| WO | 99/03255 | 1/1999 |
| WO | 99/20022 | 4/1999 |

OTHER PUBLICATIONS

"AM79R79 Ringing SLIC User's Guide," AMD, Publication No. 21109, Jun. 1997, pp. 1–10.

"Am79R79 Ringing SLIC Device Call Processing Considerations," AMD, Publication No. 21781, Sep. 1997, pp. 1–9.

"Today's xDSL Network Reality," TeleChoice, Inc., Apr. 7, 1997, pp. 1–8.

Reister, "DSL Data Service profitability, Competitive Local Exchange Carrier Analysis," Cooper Mountain Networks, Inc., Mar. 1998, pp. 1–17.

Chow et al., "A Multi–drop In–house ADSL Distribution Network," May 1994, pp. 456–460.

International Search Report, Application No. PCT/US 00/11541, mailed Oct. 19, 2000.

"Am79R79 Ringing SLIC User's Guide," AMD, Publication No. 21109, Jun. 1997, pp. 1–10.

"Am79R79 Ringing SLIC Device Call Processing Considerations," AMD, Publication No. 21781, Sep. 1997, pp. 1–9.

"Today's xDSL Network Reality," TeleChoice, Inc., Apr. 7, 1997, pp. 1–8.

Reister, "DSL Data Service profitability, Competitive Local Exchange Carrier Analysis," Cooper Mountain Networks, Inc., Mar. 1998, pp. 1–17.

* cited by examiner

*Primary Examiner*—Curtis Kuntz
*Assistant Examiner*—Melur. Ramakrishnaiah
(74) *Attorney, Agent, or Firm*—Conley, Rose & Tayon PC

(57) ABSTRACT

An improved system and method for retrofitting telecommunications infrastructures of existing buildings with new telecommunications services. The present invention allows new telecommunications services to be provided over existing telephone lines with reduce cost. The present invention also includes an improved system and method for providing a plurality of telephone connections and data traffic over a single communications channel. The present invention also provides improved telephony line interface module and telephony device embodiments which effectively implement line card functionality in the telephony line interface module and/or telephony device, respectively.

20 Claims, 31 Drawing Sheets

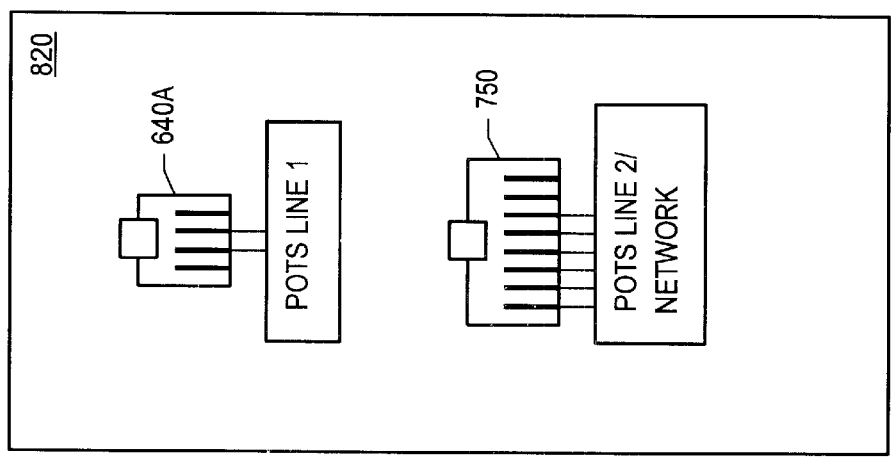
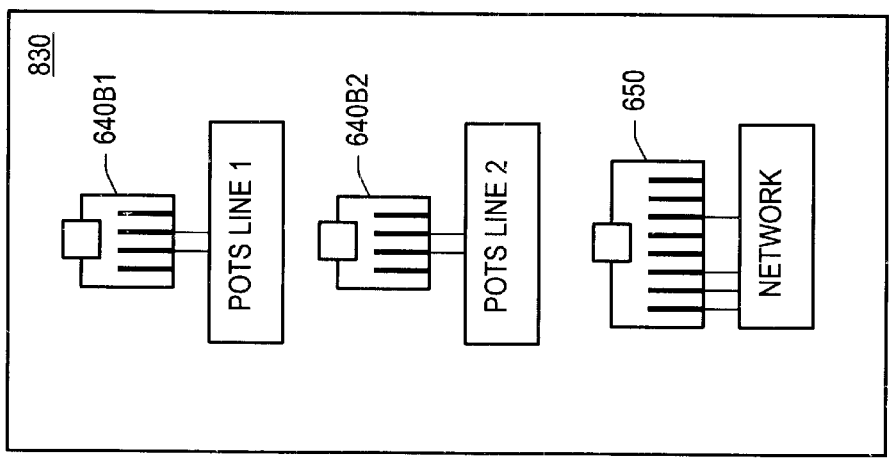
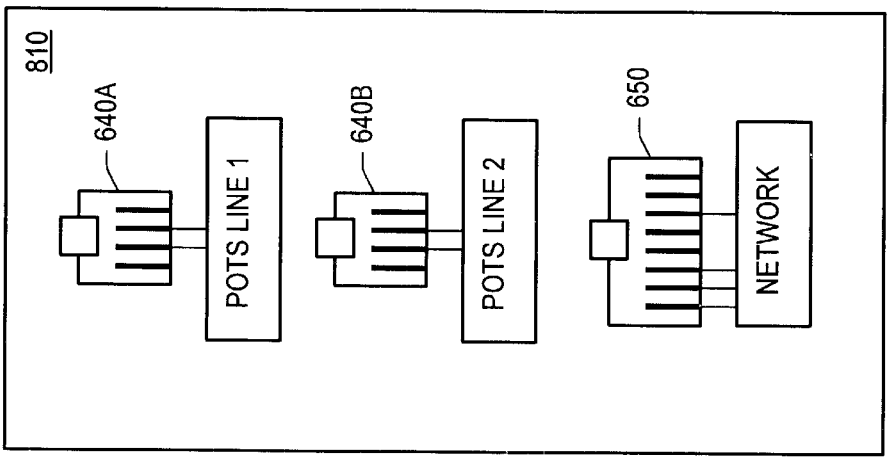
FIG. 10

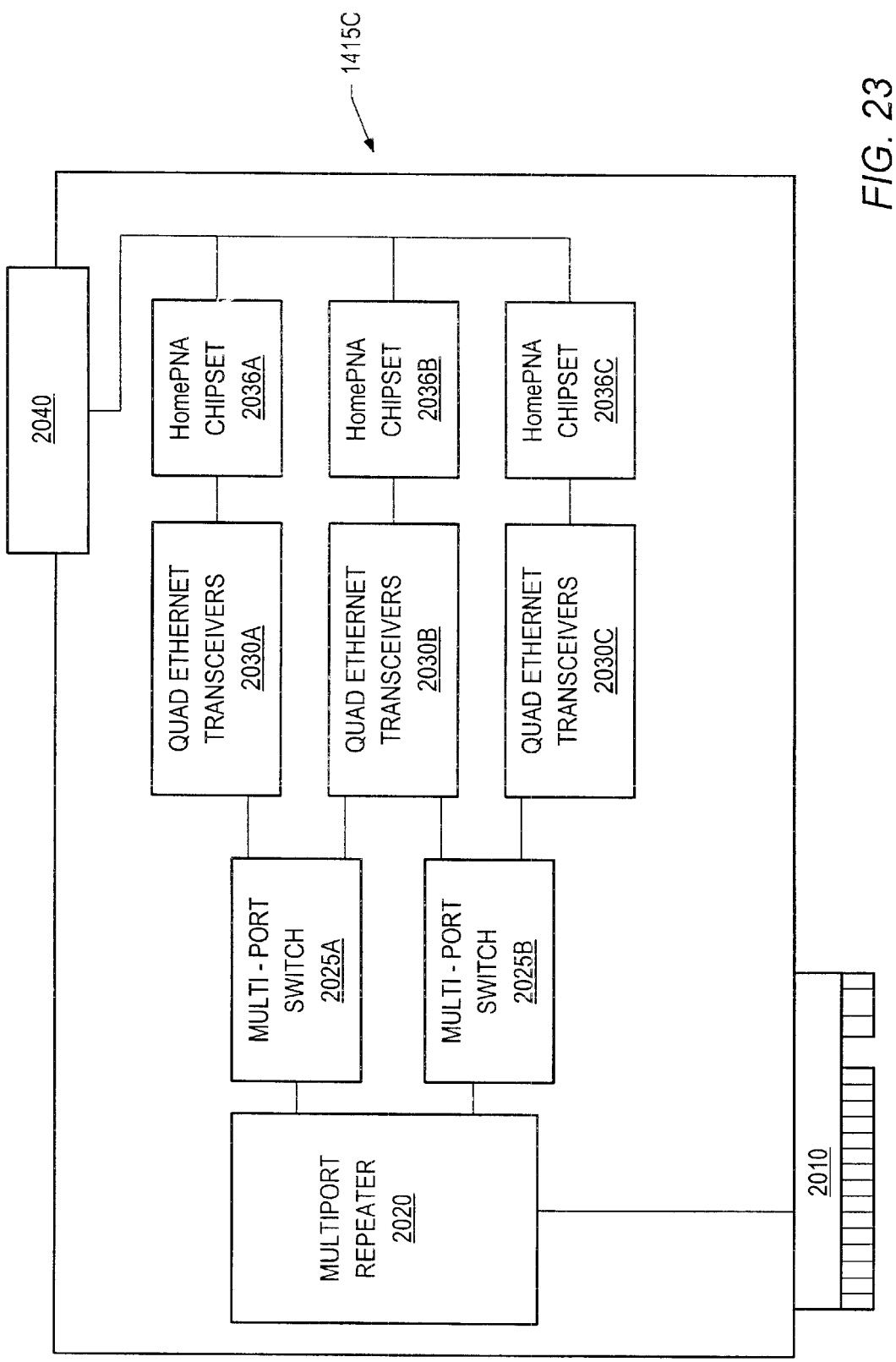

SYSTEM AND METHOD FOR RETROFITTING EXISTING BUILDING TELECOMMUNICATIONS INFRASTRUCTURES

BACKGROUND OF THE INVENTION

1. Field of the Invention

This invention relates to telecommunications and data systems, and, more particularly, to providing telephony and data network traffic over a single communications channel, such as a single two-wire telephone line.

2. Description of the Relevant Art

As newer telecommunications services have become more prevalent, existing buildings such as hotels, apartments and office buildings desire to offer these services to their inhabitants, e.g., hotel guests, apartment dwellers or office workers. However, existing buildings such as hotels and apartments have generally been unable to offer these newer telecommunication services due to the high cost of adding additional communications lines. The present cost of retrofitting existing buildings is $400 per room or more in many cases.

For example, the majority of hotels are wired such that only a single copper pair is provided to each room for a single telephone line. However, this is inadequate for standard services such as Ethernet, or simply providing two or more telephone lines to a room.

Even some recently built apartment complexes find that the wiring for their telecommunications services is underground with buried runs of several hundred feet, too far to provide Ethernet service. For example, consider an apartment complex comprising twenty small building with four to eight units per building. All wires for the telephones come to one collection point and then travel underground for about 300-m (1000-ft) to the clubhouse building. The 300-m run is in excess of the 100-m limit for Ethernet. The complex is pre-wired for telephones and cable but not high speed Internet access.

Additionally, many apartment complexes are now in the business of reselling primary telephone services using an in-house PBX. Many times, the apartment complex over-commits its telephony resources by leasing a small number of telephone lines for the PBX and providing telephone service to a larger number of apartments at a price slightly less than direct service would cost. As xDSL does not cross a PBX, being a direct connection from the central office to the end-user, the apartment complex is unable to provide xDSL to each apartment using the same method used to provide telephone service.

FIG. 1—PBX Telephony System 100

FIG. 1 illustrates a basic analog two-wire telephone connection setup 100 in the prior art. The public switched telephone network (PSTN) lines 105 are provided from the central office to a main wiring distribution facility 110 in the general vicinity of an end-user. As illustrated, the end-user is shown at a location 130A. Generally speaking, the illustrated embodiment is that of an office, hotel, or apartment complex, where the locations 130 comprises offices, hotel rooms, or apartments. Each location 130 receives telephone services through a local PBX 112.

As shown, FIG. 1 includes a main wiring distribution facility 110 including a PBX 112 coupled to receive digital telephony signals from the public switched telephone network (PSTN) 105. Line 120, shown here becoming line 120, coupled the main wiring distribution facility 110 to a first one of a plurality of user locations, including user location 130A. User location 130A, as shown, includes a junction box 132, e.g. a station jack 132, coupled to line 120. Station jack 132 couples to a first telephone 134A and a second telephone 134B. A modem jack 136 splits off of the wiring of station jack 132 to a data processing unit 138, e.g. computer 138.

Telephone signals from the PSTN 105 are routed from the PBX 112 as separate communications channels 120. Each communications channel 120 comprises one telephone line, usually with dial tone and frequently with additional telephony services such as last number redial, call waiting, etc. The individual telephone lines 120 are typically cross-connected through so-called 66 boards (or 110 boards) to a two-wire telephone line 120. The two-wire telephone line 120 runs from the main wiring distribution facility 110 to the end-user site 130A. The two-wire telephone line 120 typically comprises two copper wires that meet the requirements of Category 3 of the ANSI/TIA/EIA-568-A Standard entitled "Commercial Building Telecommunications Cabling Standard", and are often referred to as "Cat 3" wires.

At the end-user site 130A, the two-wire telephone line 120 terminates at a telephone outlet 132, including a junction box (usually a J box) and a telephone jack (usually an RJ-11 socket). Typically, an RJ-11 socket in the J box 132 receives an RJ-11 plug that connects a line to the end-user telephone 134. A modem 136 is often also connected into the same line, either through an extension outlet in a duplicate J box, or by unplugging the telephone 134 and plugging in the modem 136. The modem 136 provides data communications to a computer 138 over the telephone line 120. It is noted that while newer telephony installations may include four-wire telephone lines (so called cat5 defined by the ANSI/TIA/EIA-568-A Standard referenced above), many existing telephone lines are still two-wire telephone lines 120 (cat3).

In a general way, the prior art system of FIG. 1 operates as follows. Power for the communications over the communications channel are provided over the two-wire telephone lines 120 over which the communications are transmitted. To announce an incoming communication (i.e. a telephone call) coming in over the PSTN 105, a ring voltage (such as 48 V DC) is sent from the central office to the PBX 112. The PBX 112 sends ring voltage through the 66 box 114A, over the two-wire telephone line 120, through the RJ-11 socket in the J box 132, and into the telephone 134, which then rings. A ring may be mechanically or electronically generated. When the end-user answers the telephone call, the telephone 134 goes off-hook, and a full duplex communications stream of up to 64 kbps may be transmitted over the two-wire telephone line 120 back to the switching location 110, through the PBX 112, to the calling party.

Data communications between the computer 136 and an external network are over the same two-wire telephone line 120 as voice telephone communications. In general, data and voice are not multiplexed over the two-wire telephone line 120, although this may be performed, usually through the computer 136. The modem typically transfers data using the V.90 protocol, although other protocols (V.34, etc.) are also used. Data transfer rates are generally limited to 56 kbs downstream to the computer 136 and 53 kbps upstream.

Recent developments have led to some merging of multiple communications lines onto fewer numbers of communications channels. For example, ISDN (Integrated Services Digital Network) communications provides for simultaneous voice and data connections over the existing telephone infrastructure.

Digital Subscriber Line (DSL) provides for POTS telephony communications in the lower frequency band coupled with digital communications in the upper frequency bands. In Digital Subscriber Line communications (generally designated as xDSL), the communications channel is pinged to characterize the channel, typically a four-wire telephone line. The frequency spectrum of the channel is then divided into sub-channels or bins for data transmission. The number and division of the sub-channels may be determined by the channel response, up to the limits of the particular communications scheme chosen. The maximum data throughput on xDSL ranges from 128 kbps duplex using IDSL (ISDN DSL) to 52 Mbps downstream and 1.5 Mbps upstream using VDSL (Very high bit rate DSL). It is noted that SDSL (Symmetric DSL), also called HDSL (High bit rate DSL), uses a two-wire telephone line to deliver up to 2.0 Mbps duplex.

As another example, U.S. Pat. No. 5,844,596 teaches that two pairs of telephone wires may be used, along with a low pass filter and a high pass filter, to route a telephone line and a video connection to a desired location. This method has the advantage of routing two different communication lines onto a single communications channel consisting of a two-wire telephone line. This disclosure teaches that the voice data is segregated into a sub-channel in the voice frequency band. Video or other data are transmitted over a higher frequency range different and separate from the voice frequency range. The data throughput taught is less than 64 kbps total.

Applicant is aware of several systems from Tut Systems which also purport to provide voice and data connectivity over existing wiring.

FIG. 2—Telephony System 200 with POTS and DSL

FIG. 2 illustrates an example of a prior two-wire telephone line communications channel 220, including one telephone line and data signals. The single telephone line is provided by a POTS line from the PBX 112, while the data signals are provided through DSL transceiver 236A at a main wiring distribution facility 210. The DSL signals from DSL transceiver 236A are added to telephone line 120 in the higher frequency range while the POTS telephone signals are transmitted in the lower frequency range. The POTS line and the DSL signals are provided to the user location 230A, which may be one of a plurality of user locations 230.

As shown, FIG. 2 includes a main wiring distribution facility 210 including a PBX 112 coupled to receive digital telephony signals from the PSTN 105. PBX 112 is coupled to POTS splitter 214 through line 120. DSL transceiver 236A couples network signals from the network 205 to the over line 216 to the POTS splitter 214. The main wiring distribution facility 210 is coupled to the user location 230A by a two-wire telephone line 120. At the user location 230A, a station jack 232 receives POTS telephone signals and the DSL signals, providing the POTS telephone signals to a telephone 134 and the digital DSL signals to a DSL transceiver 236B. The digital transceiver 236B is coupled to a computer 138.

Telephone signals from the PSTN 105 are routed from the PBX 112 as separate communication channels 120. Each communication channel 120 comprises one telephone line, usually with dial tone and frequently with additional telephony services, as mentioned above, over a two-line telephone line 120. The DSL transceiver 236A operates to convert network traffic coming over network 205 into DSL traffic routed over line 216 on to cat 3 telephone line 120 at POTS splitter 214.

At the end-user site 230A, the two-wire telephone line 120 terminates at a station jack 232. Station jack 232 typically includes a junction box (usually a J box) and a telephone jack (usually an RJ-11 socket). Typically, the RJ-11 socket in the J box receives an RJ-11 plug that connects a line to the end-user telephone 134. The second DSL transceiver 236B is coupled to two-wire telephone line 120 at station jack 232. The DSL transceiver 236B is a separate device outside the station jack 232 and couples typically only to the computer 138. The use of DSL transceiver 236B typically replaces the use of a modem in the computer 138.

In a general way, the prior art system 200 of FIG. 2 operates as follows. As with the system of prior art FIG. 1, POTS telecommunications are provided from the PSTN 105, through the PBX 112, over the two-wire telephone line 120, to the station jack 232, to the end-user telephone 134. Data communications between the computer 138 and an external network 205 are over the same two-wire telephone line 120 as the POTS voice telephone communications.

What is needed is a system and method for retrofitting buildings with improved telecommunications services over the existing telephone wiring. Also desirable is a system and devices for providing a plurality of voice telephone sub-channels and a network data sub-channel over a single two-wire telephone line. The total bandwidth would preferably exceed 4 Mbps of throughput and possibly be as high as 100 Mbps.

SUMMARY OF THE INVENTION

The present invention provides an improved system and method for retrofitting telecommunications infrastructures of existing buildings with new telecommunications services. The present invention allows new telecommunications services to be provided over existing telephone lines with reduce cost. The present invention also includes an improved system and method for providing a plurality of telephone connections and data traffic over a single communications channel. The present invention also provides improved telephony line interface module and telephony device embodiments which effectively implement line card functionality in the telephony line interface module and/or telephony device, respectively.

BRIEF DESCRIPTION OF THE DRAWINGS

Other advantages and details of the invention will become apparent upon reading the following detailed description and upon reference to the accompanying drawings in which:

FIG. 10 is a block diagram of multiple embodiments for faceplates for the line interface modules shown in FIGS. 8–9;

FIG. 23 is a block diagram of an alternative embodiment of a line card of the alternative embodiment of a modulation unit of FIG. 16;

Figure 1:
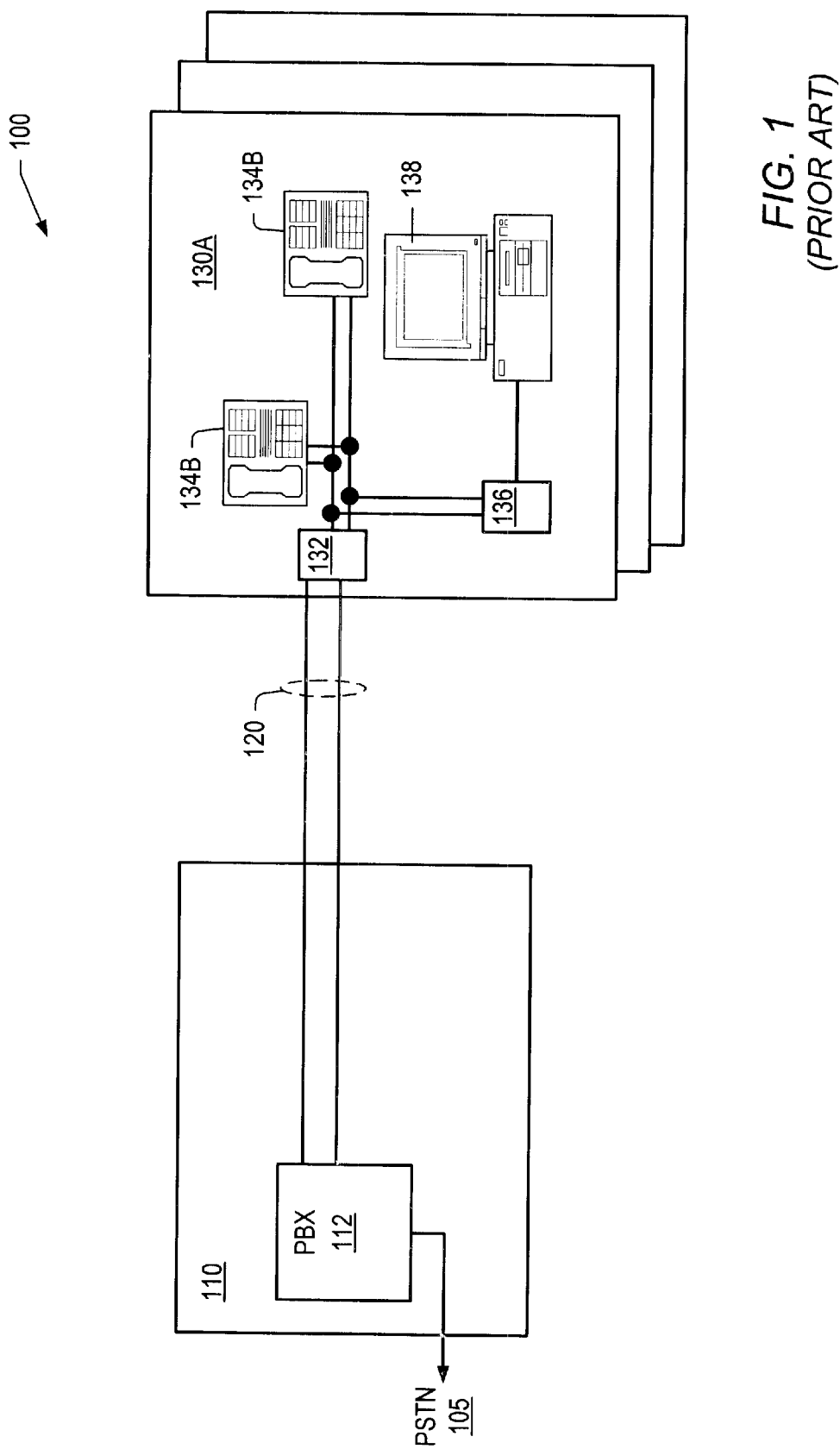
FIG. 1 is a block diagram of a prior art two-wire analog telephone line communications channel routed from the PSTN through a PBX.
Figure 2:
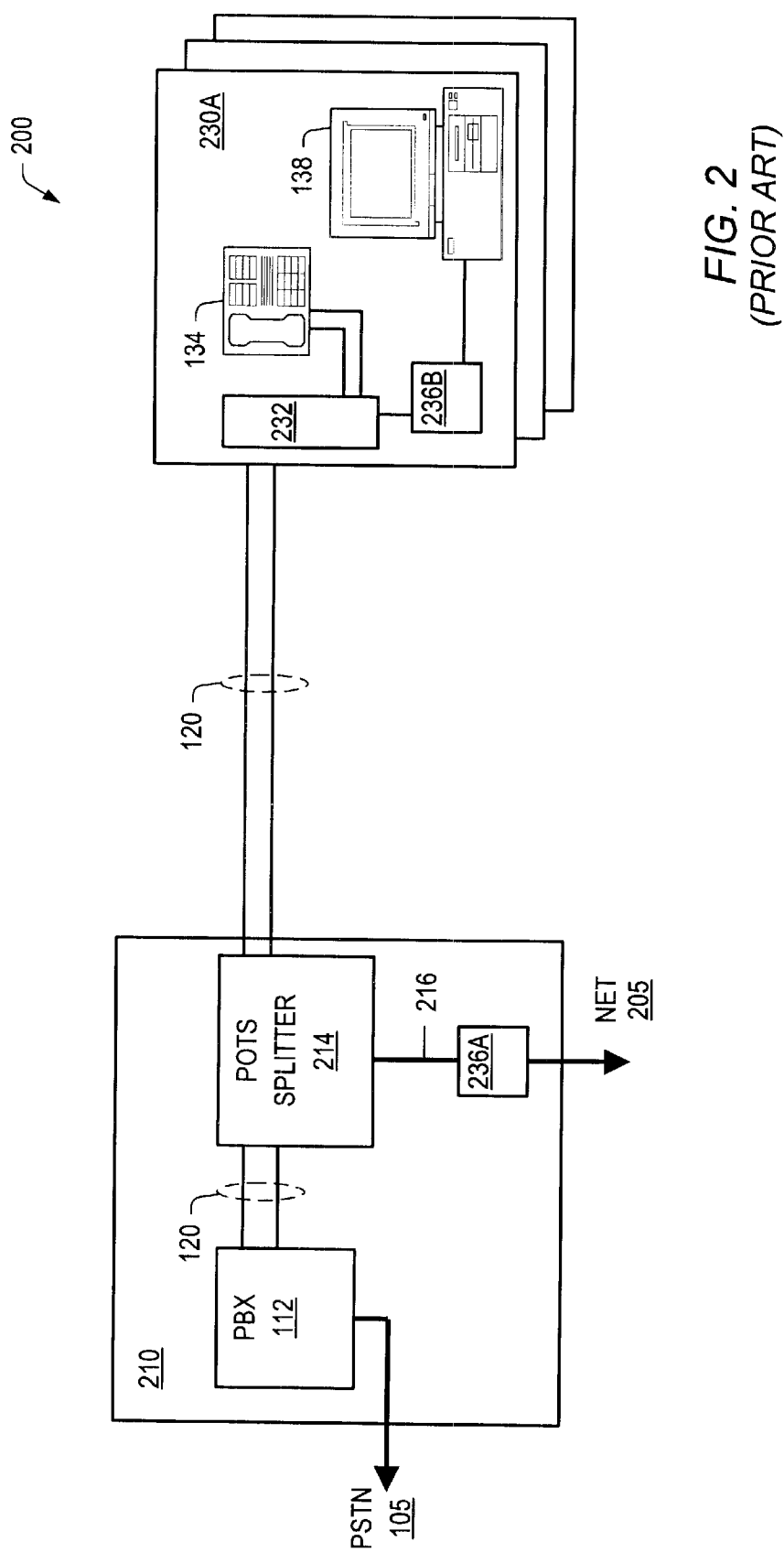
FIG. 2 is a block diagram of a prior art two-wire communications channel with a telephony sub-channel from the PSTN routed through a PBX and a data network sub-channel from a network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE
PREFERRED EMBODIMENTS

FIGS. 3–5: Existing and Retrofit Examples for a Telecommunications Infrastructure FIGS. 3–5 illustrate various examples of existing telecommunications infrastructure in buildings such as hotels, apartments and office buildings and also illustrate a retrofit of the telecommunications infrastructure using various embodiments of the present invention. In each of FIGS. 3–5, the "A" figure illustrates an existing telecommunications infrastructure in a building, such as a hotel, apartment or office building, and the "B" figure illustrates an example of a retrofit to provide new telecommunications services using components according to the present invention. In each of the embodiments described, the existing copper pair wiring in the building may be used without any retrofit or replacement of the existing wiring. This significantly reduces the cost of the retrofit.

Figure 3A:
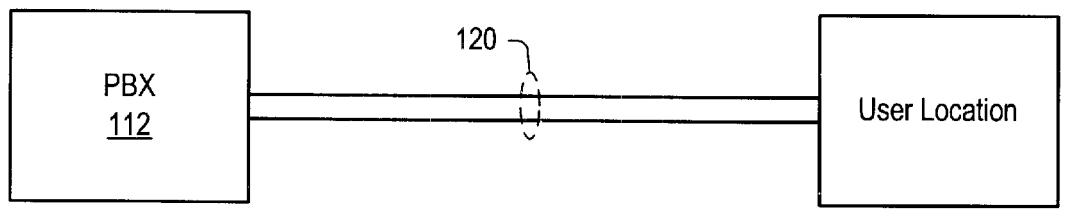
FIG. 3A illustrates an existing telecommunications infrastructure including a single copper pair provided from a PBX to each user location.
Figure 3B:
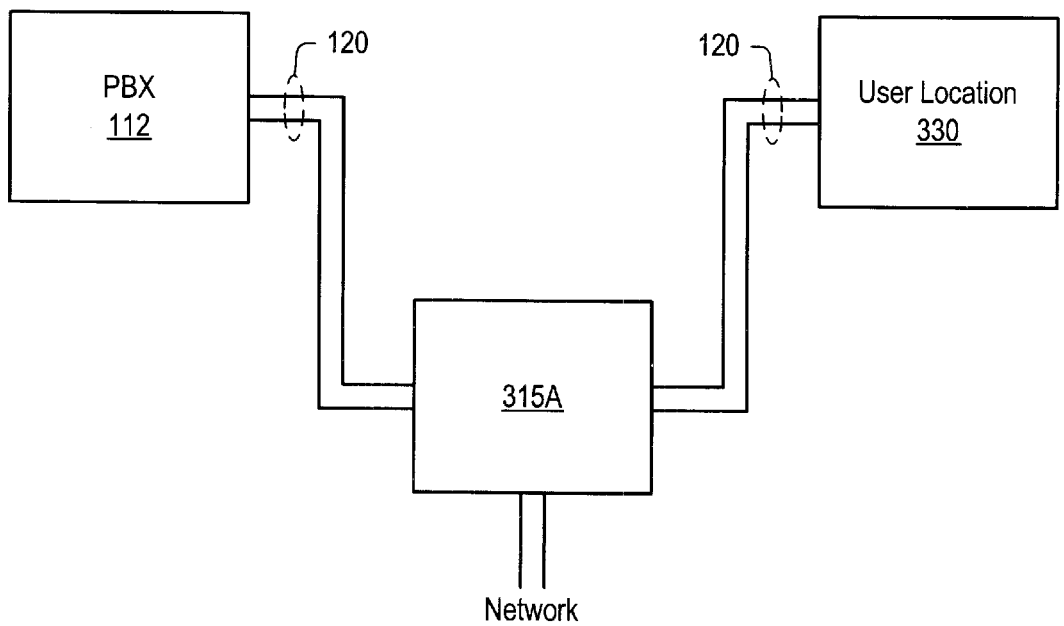
FIG. 3B is a high level diagram illustrating an example retrofit of this infrastructure.

FIG. 3A illustrates a telecommunications infrastructure wherein a PBX 112 is wired to provide only a single copper pair 120 to each user location or room to provide a single telephone line. FIG. 3B is a high level diagram illustrating an example retrofit of this infrastructure according to the present invention. As shown, the PBX 112 provides the existing single copper pair 120 out to the network distribution unit 315. This network distribution unit 315 provides connectivity to a network, such as an Ethernet network or the Internet. The existing copper pair 120 is coupled between the network distribution unit 315 and the user location 130. Thus the existing copper pair 120 is used. The NDU 315 communicates digital signals from the network and POTS or analog telephony signals from the PBX 112 with the user location 130.

Figure 4A:
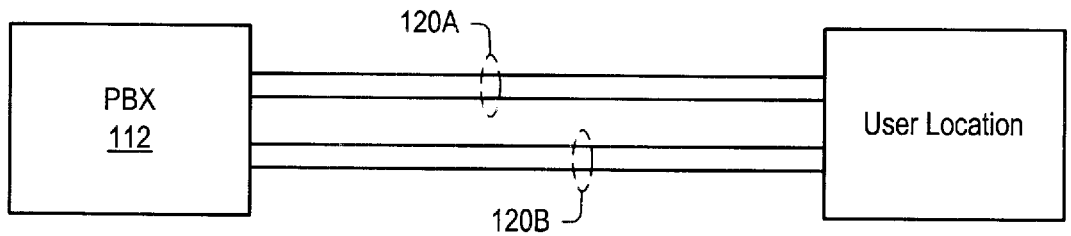
FIG. 4A illustrates an existing telecommunications infrastructure including two copper pairs provided from a PBX to each user location.

FIG. 4A illustrates an existing telecommunications infrastructure in a building, when the PBX 112 is configured to provide two copper pairs 120A and 120B to each user location or room. These two pairs of copper wiring would be useful to provide two telephone lines to the user location or room, such as for a first and second telephone number, or for use as a telephone line and modem connection, among other uses.

Figure 4B:
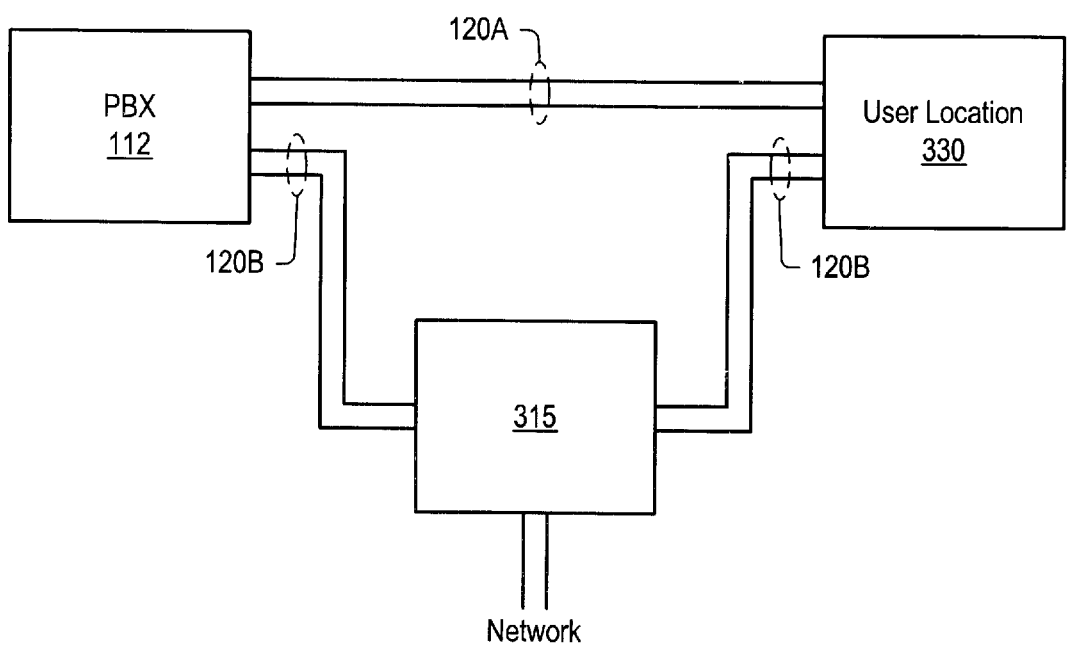
FIG. 4B is a high level diagram illustrating an example retrofit of this infrastructure.

FIG. 4B illustrates a retrofit of this telecommunication infrastructure according to one embodiment of the present invention. As shown, in this embodiment, one of the copper pairs 120B from the PBX 112 may be provided to a network distribution unit (NDU) 315. The NDU 315 also includes an I/O port for coupling to a network, as shown. The copper pair 120B is also coupled between the NDU 315 and the user location or room 130. One advantage of the embodiment shown in FIG. 4B is that an existing copper pair 120A remains directly provided from the PBX 112 to the user location 130, thus guaranteeing existing lifeline or emergency services during a power failure.

In another embodiment, the retrofit in FIG. 4B may involve providing both pairs of copper wires 120A ad 120B from the PBX to the NDU 315, and then providing both pairs of copper wires 120A ad 120B from the NDU to the user location. If both copper pairs are provided from the PBX 112 through the NDU 315 to the user location 130, then POTS lifeline services may not be guaranteed.

Figure 5A:
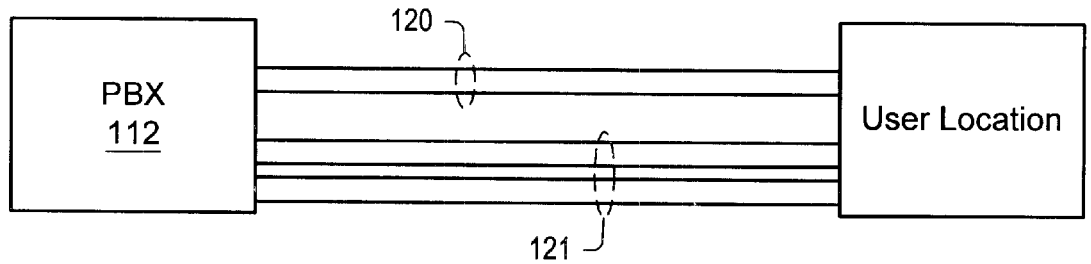
FIG. 5A illustrates an existing telecommunications infrastructure including one or two copper pairs and category 5 wiring provided from a PBX to each user location.
Figure 5B:
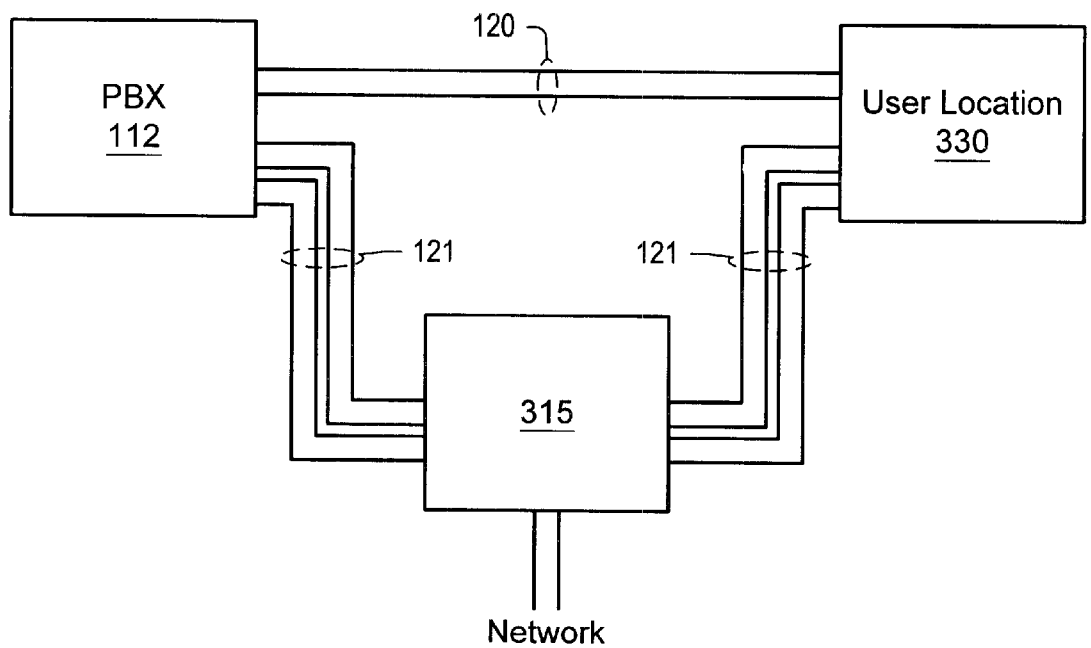
FIG. 5B is a high level diagram illustrating an example retrofit of this infrastructure.

FIG. 5A illustrates an existing telecommunications infrastructure for an existing building, wherein the PBX provides one or two pairs of copper wires 120 to each user location or room, and in addition provides more advanced wiring 121 to the room, such as category 5 twisted-pair wiring. FIG. 5B illustrates one example of a retrofit of this infrastructure. As shown, this retrofit embodiment comprises providing the category 5 twisted-pair wiring 121 from the PBX through the NDU 315, wherein the NDU 315 also includes a network connection as shown, with the category 5 wiring 121 being provided out from the NDU 315 to the user location 130.

Figure 6:
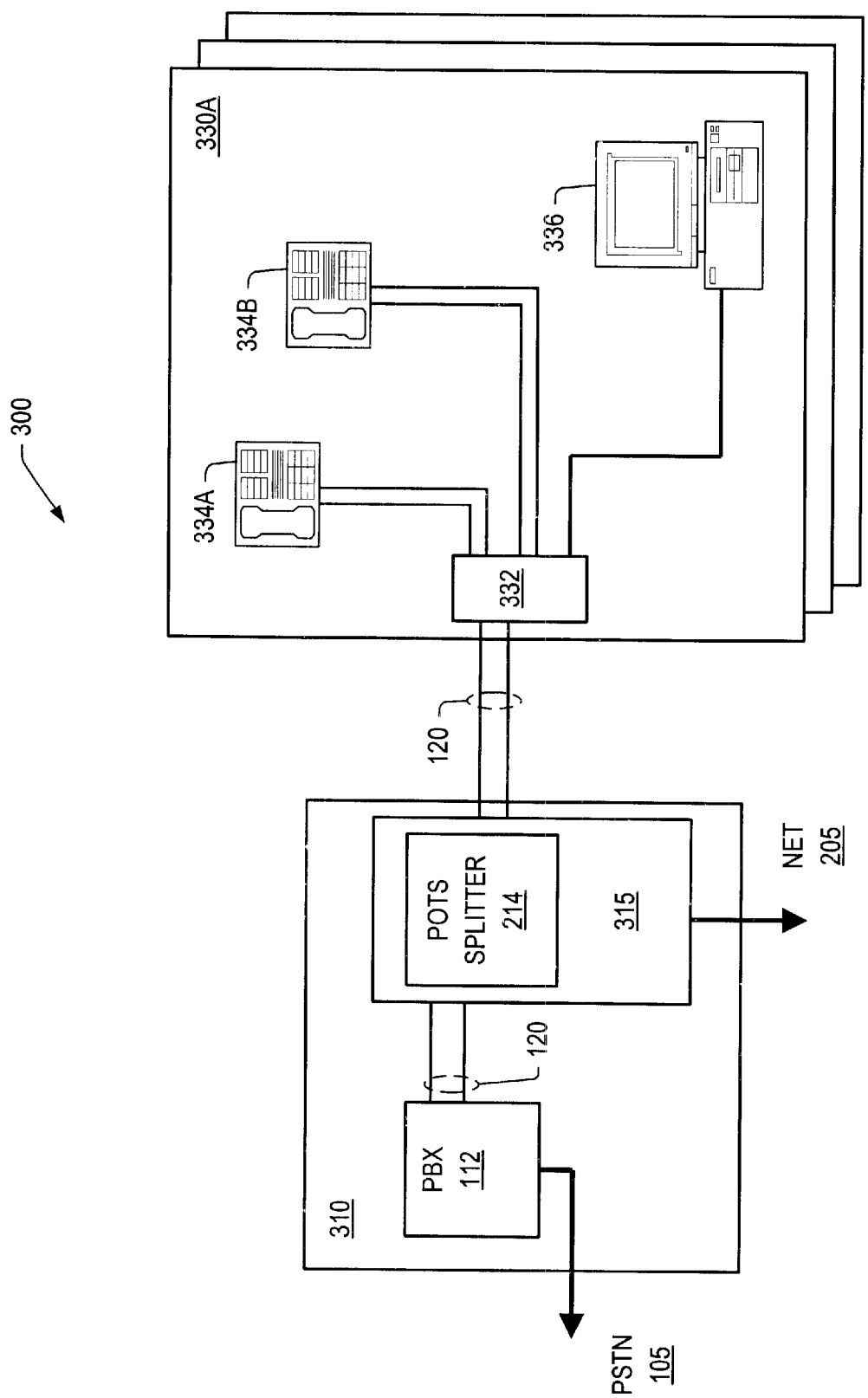
FIG. 6 illustrates a retrofit system wherein a two-wire communications channel is used to support two or more telephony voice channels and a high speed data network connection, with one of the telephony voice channels being analog POTS.

FIG. 6—Advanced Telephony System 300

FIG. 6 illustrates one embodiment of a system 300 for providing a plurality of telephone connections and data traffic over a single communications channel. Specifically, the illustrated embodiment comprises two telephone lines and a network data line over a single twisted copper pair of telephone wires. It is noted that for the purposes of this disclosure, the term "telephone" or "telephony device" is intended to refer to telephones, telephone-like instruments, and other devices capable of acting as a transceiver for what are generally referred to as voice or telephone conversations, including computers, wireless phones, etc. Other contemplated telephone-like instruments include, but are not limited to, modems, and integrated multifunction devices.

As shown, system 300 includes a main wiring distribution facility 310 coupled to first one of a plurality of user locations, including user location 330A, by a two-wire telephone line 120A. The main wiring distribution facility 310, as shown, includes a PBX 112 coupled to the public switched telephone network (PSTN) 105, a modulation unit 315, including a POTS splitter 214, coupled to the PBX though line 120. The user location 330A includes a line interface module 332 coupled to the telephone line 120A. A first telephone 334A, a second telephone 334B, and a data processing unit 336, shown as computer 336, are also coupled to the line interface module 332.

Existing hotels and apartment complexes have generally been unable to offer newer telecommunication services due to the high cost of adding new or additional communications lines. The system of FIG. 6 allows a building to be retrofit for improved telecommunications services over the existing telephone wires. Generally speaking, the illustrated embodiment is that of an office, hotel, or apartment complex, where the plurality of locations 330 comprise offices, hotel rooms, or apartments. Each individual location 330A, 330B, etc. receives telephone services through a local PBX 112, although it is noted that separate POTS lines may be provided instead. It is noted that the embodiment of FIG. 6 could also be used with a planned community or any location with centrally controlled telecommunications services.

In the illustrated embodiment, the single communications channel comprises a two-wire telephone line 120A. It is noted while that the two-wire telephone line 120A is physically the same as the two-wire telephone line 120 of FIG. 1, two-wire telephone line 120 of FIG. 1 typically carries analog signals comprising either telephony signals from a single telephone or data signals from a single modem, while two-wire telephone line 120A preferably carries the digital format integrated data stream disclosed herein. Incoming telephone calls are routed from the PSTN 105 to a main wiring distribution facility 310 in the general vicinity of the end-user. Data network traffic 205 is also routed to the main wiring distribution facility 310. As illustrated, the end-user accesses the telecommunications services (e.g. voice and data) at a location 330A, preferably one of a plurality of locations 330.

Telephone signals from the PSTN 105 are preferably routed out of the PBX 112 as separate communications channels 120. Each communications channel 120 preferably comprises one telephone line, usually with dial tone and frequently with additional telephony services such as redial, call waiting, etc. Communications channel 120 provides the telephone line to a distribution unit 315. Distribution unit 315 includes the POTS splitter 214. Data network traffic is also provided to the distribution unit 315 as shown. The distribution unit 315 adds the digital data network traffic 205 to the telephone line from communications channel 120 and outputs it on a two-wire telephone line 120A through the POTS splitter 214. From the POTS splitter 214, two-wire telephone line 120A would normally be routed to a 66 block or 110 block for routing to the end-user location 330A. The two-wire telephone line 120A runs from the main wiring distribution facility 310 to the end-user site 330A.

At the end-user site 330A, the two-wire telephone line 120A ends at a line interface module 332 inside a junction box (preferably a J box). The line interface module 332 preferably includes one or more telephone jacks (preferably RJ-11 sockets) and a network connection (preferably an RJ-45 socket). One or more telephones 334 connect to each RJ-11 socket in the line interface module 332. As shown, telephones 334A and 334B connect to the line interface module 332. A data processing unit 336, shown as computer 336, also connects to the line interface module 332. It is noted that a modem (such as modem 138 of FIG. 1) may be connected in place of a telephone 334 (preferably 334B, as is explained below with respect to FIGS. 9–10) for coupling another data processing unit (not shown) to the line interface module 332.

In a general way, the system of FIG. 6 operates as follows: Power for the communications channel is provided over the two-wire telephone line 120A. To announce an incoming communication (i.e., a telephone call) coming in over the PSTN 105, a ring voltage, e.g. 48 V, is sent from the central office, to the PBX 112, over line 120, and to the modulation unit 315. The modulation unit 315 passes the signal through the POTS splitter 214 to the telephone line 120A. The modulation unit 315, which includes its own POTS splitter 214, passes the incoming communication to the telephone 334A for which the communication is intended. The modulation unit 315 also outputs an integrated (i.e., voice, data and/or control signals) data stream onto telephone line 120A. For example, a telephone call coming in over the network 205 as a "voiceover IP" telephone call is received by the modulation unit 315 and encoded into the integrated data stream. The modulation unit 315 encodes a ring notification signal and passes the ring notification signal down the two-wire telephone line 120A into the line interface transducer 332. At the line interface transducer 332, ring voltage is generated to cause the respective telephone 334 to ring. The voiceover IP telephone call is transmitted concurrently with a POTS telephone call from the PBX 112. In a preferred embodiment, all bandwidth not provided as telephone signals over telephone line 120A is reserved for the use of data signals transferred over telephone line 120A to the data processing equipment 336.

According to another embodiment, the system of FIG. 6 operates as follows. Power for the communications over the communications channel is provided over the two-wire telephone line 120A. To announce an incoming communication (i.e. a telephone call) coming in over the PSTN 105, a ring voltage, e.g. 48 V, is sent from the central office, to the PBX 112, to the modulation unit 315. The modulation unit 315 encodes a ring notification signal into an integrated (i.e. voice, data and/or control signals) digital data stream. The modulation unit 315 also passes the ring voltage and the integrated data stream down the two-wire telephone line 120A to the line interface transducer 332. At the line interface transducer 332, the ring voltage is used to cause the respective telephone 334 to ring. The line interface transducer 332 also routes telephony signals to the other telephone(s) 334, if they are in use. In one embodiment, bandwidth that is unused by telephone signals carry data signals for the use of data processing equipment such as computer 336.

To implement, a new 66 block is added next to the existing 66 block, where the phone lines 120 are connected, leaving the existing PBX in place. The bridge clips are removed on the existing 66 block and cross-connected to the new 66 block, through the modulation unit 315. By removing the bridge clips, the PBX 112 and the room telephones 334 will notice a difference only of a cleaner signal line. Over telephone line 120A there will now be no place for buzz or hum to be picked up between the 66 block and the J box in location 330A. In one embodiment, a QAM constellation, e.g. with 16 points, is used for modulation. Each point in the constellation may jitter but not so much that it cannot be resolved with minimum error.

In a preferred embodiment, modulation unit 315 uses the entire frequency range available of the telephone line 120A. In one embodiment the modulation unit 315 "pings" each two-wire telephone line 120A to determine how many telephone channels are available, if more than two telephone channels are desired. Preferably, either a two or four bit per hertz modulation scheme is used over the telephone line 120A to provide ten Mbps plus 2×64 kbps telephony over the CAT 3 wires 120A. As shown in FIG. 3, PBX 112 sees a ground start line and believes it is operating according to regular telephony procedures, e.g. when the PBX 112 sees 600 ohms, the PBX 112 goes off hook and provides telephony services.

It is noted in a preferred embodiment, any number of two-wire telephone lines 120A are contemplated as being coupled to the modulation unit 315. Each individual two-wire telephone line 120A also couples to one or more line interface units 332.

Figure 6A:
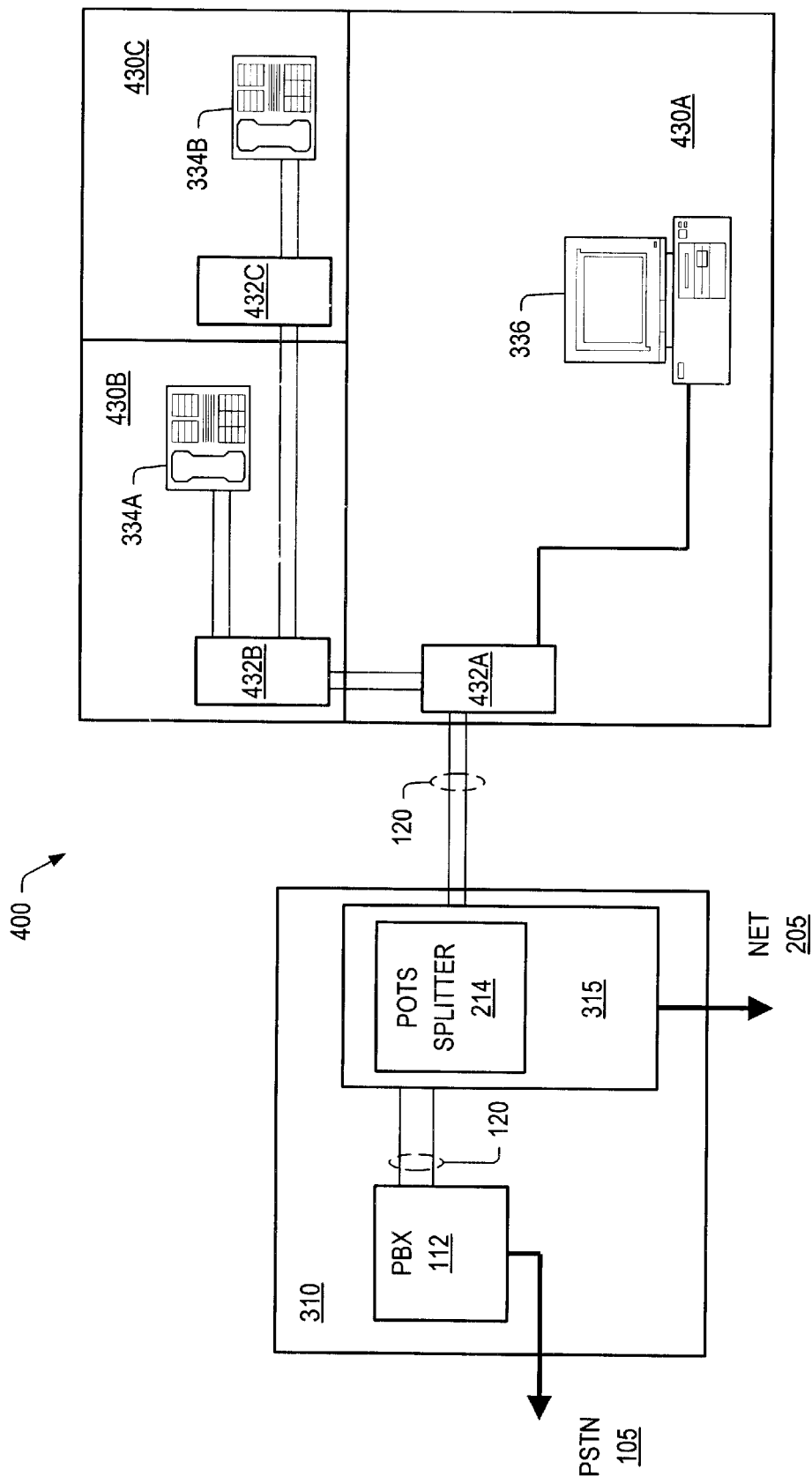
FIG. 6A illustrates a retrofit system wherein a two-wire communications channel is used to support two or more telephony voice channels and a high speed data network connection, with the telephony and data services distributed through multiple locations at the user site, with one of the telephony voice channels being analog POTS.

FIG. 6A—Advanced Telephony System with Multiple Phone Lines and Network Access

FIG. 6A illustrates an alternative embodiment of the system described in FIG. 6. In the embodiment of FIG. 6A, instead of providing the advanced telephony services to only a single user location, e.g., a room, the advanced telephony services are provided to a plurality of user locations through replicated line interface modules 432A–C. These line interface modules 432A–C operate to extend or replicate the advanced telephony services to different user locations or rooms. In other words, each of the line interface modules 432A–C may be placed in different rooms for the convenience of the user. As an example, in an office suite or hotel suite, the user or provider may desire a first telephone line in a first room, a second telephone line in a second room, and network access in one or more of the rooms.

System 400 of FIG. 6A, as illustrated, shows telephone signals from the PSTN 105 routed to a PBX 112. A separate communications channel 120 is provided from the PBX 112 and routed to a modulation unit 315, preferably including POTS splitter 214. Data transmissions from a computer network 205 are also routed to the modulation unit 315. Each communications channel 120 preferably comprises one telephone line, usually with dial tone and frequently with additional telephony services such as redial, call waiting, etc. The modulation unit 315 transmits telephony and data signals over telephone line 120A to the end-user site shown with rooms 430A, 403B and 430C. The two-wire telephone line 120A ends at a line interface module 432A shown in room 430A.

Also as illustrated, a data connection (preferably through an RJ-45 jack) is provided to a computer 336. Line interface module 432A is also coupled through telephone wires to a second line interface module 432B in room 430B. Line interface transducer 432B provides telephony services to telephone 334A in room 430B. Line interface module 432B also provides telephone and/or data signals to line interface module 432C in room 430C. Telephone 334B in room 430C receives telephone signals from line interface modules 432C.

In the embodiment illustrated in FIG. 6A, the telephones 334A and 334B may receive differing telephony signals and differing telephony services through their respective line interface modules 432B and 432C. Although not shown in FIG. 6A, data signals may be provided by line interface transducers 432B and 432C and telephony signals may be provided by line interface transducer 432A, as desired.

Figure 7A:
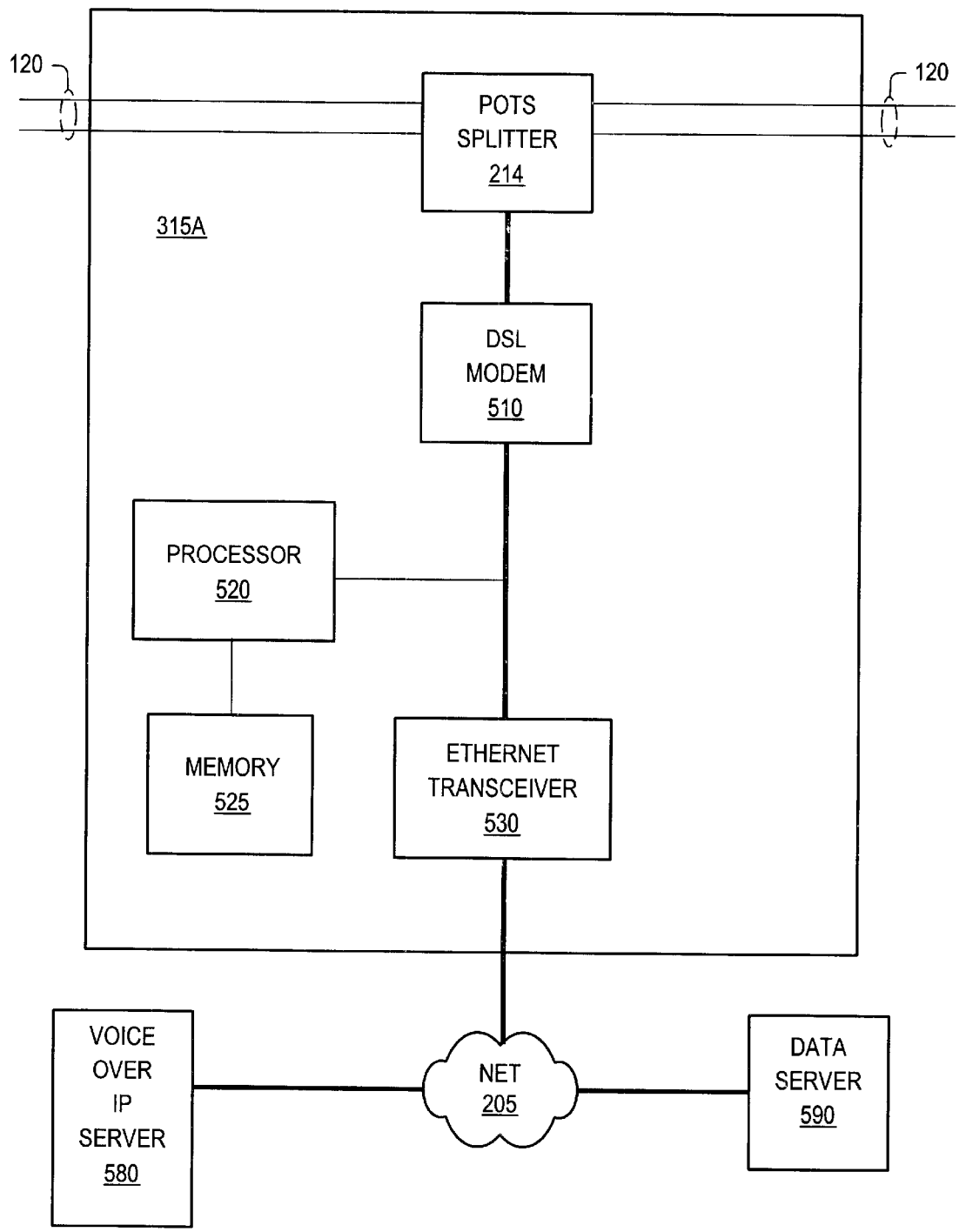
FIG. 7A is a block diagram of an embodiment of the modulation unit of FIG. 6 that supports two or more telephony voice channels and the network connection over the two-wire communications channel, with one of the telephony voice channels being analog POTS.

FIG. 7A—Modulation Unit 315A

FIG. 7A illustrates one embodiment of modulation unit 315A. In the modulation unit 315A of FIG. 7A, the modulation unit 315A passes POTS telephony signals from PBX 112 over line 120, through POTS splitter 214, and through line 120A directly to the user location(s). The modulation unit 315A also receives digital signals and provides these signals through POTS splitter 214 and through line 120A directly to the user location(s). The digital signals may include one or more of a voice and/or data stream, e.g., an integrated data stream.

As shown, modulation unit 315A includes POTS splitter 214, DSL modem 510, processor 520, memory 525, and Ethernet transceiver 530. The modulation unit 315A receives analog (POTS) telephony signals over telephone line 120 from the PBX 112 into a POTS splitter 214.

Data is received over network 205, such as from a data server 590 or a Voice over IP server 580. Thus, various servers, such as voice over IP server 580 and/or data server 590, may provide data signals over network 205 to the modulation unit 315A. The data from the network is received by a digital transceiver such as Ethernet transceiver 530. The data is transferred from Ethernet transceiver 530 to processor 520. Processor 520 preferably includes or is coupled to memory 525. Memory 525 is configured to store data as required by the processor 520. The processor 520 outputs integrated telephony and/or data signals to another transceiver, such as DSL modem 510.

DSL modem 510 operates to receive voice and/or data signals from processor or Ethernet transceiver 530 and convert the signals into a digital subscriber line (DSL) format. The DSL format may be one of ADSL, SDLS, HDSL, etc. Transceiver 510 may of course use other data transfer protocols, as desired.

DSL modem 510 provides a DSL data stream, referred to as the integrated data stream, which may comprise integrated data and voice signals, to the POTS splitter 214 for output over the two-wire telephone line 120A. As mentioned above, the POTS splitter 214 also receives POTS telephone signals from telephone line 120. The POTS splitter 214 outputs analog POTS telephone signals and integrated digital data signals onto two-wire telephone line 120A.

When the modulation unit 315A receives a data stream, including POTS telephone signals and an integrated data stream, over two-wire telephone line 120A, the modulation unit 315A operates in reverse fashion. In this instance, POTS splitter 214 passes the analog or POTS telephony signals through line 120 to PBX 112. The POTS splitter 214 also provides integrated data stream to DSL modem 510. The DSL modem 510 receives the integrated data stream and provides the integrated data stream to the processor 520. The processor 520 provides digital data signals destined for locations on the network 205 to the Ethernet transceiver 530. Ethernet transceiver 530 is further configured to provide digital data signals, e.g. data packets, to one or more servers or locations over network 205.

Figure 7B:
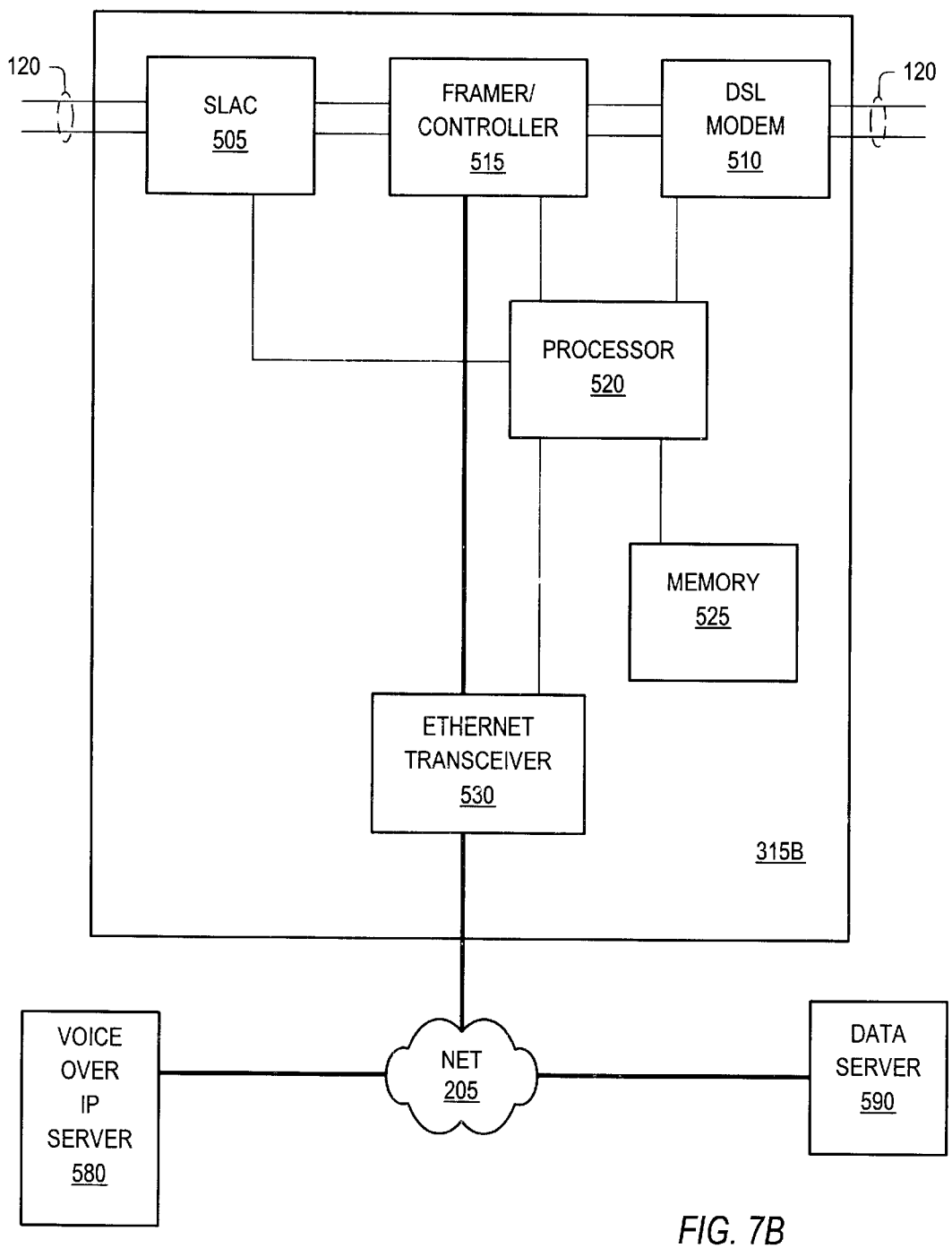
FIG. 7B is a block diagram of an alternative embodiment of the modulation unit of FIG. 6 that supports two or more telephony voice channels and the network connection over the two-wire communications channel, with all of the telephone voice channels being transmitted digitally in an integrated data stream.

FIG. 7B–Modulation Unit 315B

FIG. 7B illustrates a different embodiment of modulation unit 315B. Elements in FIG. 7B which are similar or identical to those in FIG. 7A have the same reference numerals for convenience. In this embodiment, the modulation unit 315B operates to convert received POTS telephone signals into a digital data stream. Thus, in this embodiment, the modulation unit 315B operates to output only a digital data stream.

As shown, modulation unit 315B comprises SLAC 505, processor 520, memory 525, DSL modem 510, and Ethernet transceiver 530. The modulation unit 315B receives analog telephony signals over telephone line 120 from the PBX 112. The analog telephony signals are received by a subscriber line circuit shown as a SLAC 505. The subscriber line circuit 505 typically includes analog to digital conversion logic and digital to analog conversion logic. The analog to digital conversion logic converts the analog telephony signals received from telephone line 120 into digital telephony signals and provides those digital telephony signals to processor 520.

Various servers, such as voice over IP server 580 and/or data server 590, may provide data signals over network 205 to the modulation unit 315B. Data received over network 205 are received by a digital transceiver, such as Ethernet transceiver 530. The data is transferred from Ethernet transceiver 530 to processor 520. Processor 520 preferably includes or is coupled to memory 525. Memory 525 is configured to store data as required by the processor 520. The processor 520 integrates the digital telephony signals from subscriber line circuit 505 with the digital network signals from Ethernet transceiver 530 and outputs integrated digital signals, possibly with added control signals, to the digital transceiver, such as DSL modem 510.

DSL modem 510 converts the signals into a digital subscriber line (DSL) format and provides the integrated data stream (including one or more of digital voice, digital data, and control signals) onto two-wire telephone line 120A.

When the modulation unit 315B receives an integrated data stream, including one or more of digital voice, digital data and control signals, over two-wire telephone line 120A, the modulation unit 315B operates in reverse fashion. In this instance, DSL modem 510 receives the integrated data stream and provides the integrated data stream to the processor 520. The processor 520 operates on the integrated data stream to provide digital data signals destined for the PBX 112 to the subscriber line circuit 505. The processor 520 provides digital data signals destined for locations on the network 205 to the Ethernet transceiver 530. Ethernet transceiver 530 is further configured to provide digital data signals, e.g. data packets, to one or more servers or locations over network 205.

It is noted that at least a portion or all of the modulation unit 315B may be implemented directly in a line card of the PBX 112.

In one embodiment of FIG. 7B, the modulation unit 315B communicates only with network 205, and no connection is made to a PBX 112. Thus SLAC 505 is not necessary, PBX 112 is not necessary, and all voice traffic is routed through the transceiver 530 to the network, such as using voice over IP. In this embodiment, the processor 520 operates to emulate various PBX features to the user locations to provide various PBX services to the various telephony devices at the user locations 130, such as line indications, three-way calling, conference calls, etc.

Figure 8A:
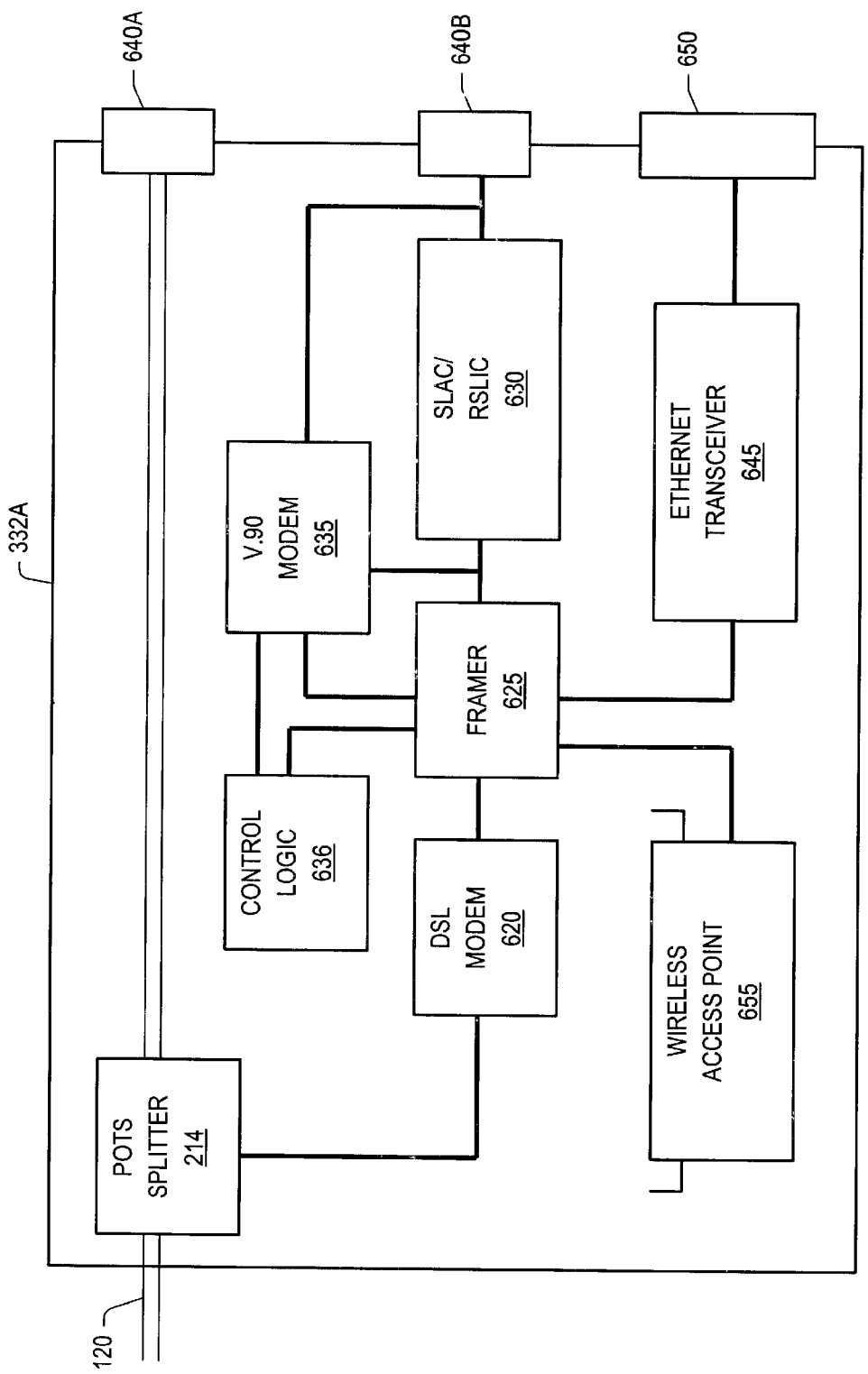
FIG. 8A is a block diagram of an embodiment of the line interface module of FIG. 6, corresponding to the modulation unit of FIG. 7A, that supports the plurality of telephony voice channels and the high speed data network connection over the two-wire communications channel, with one of the telephony voice channels being analog POTS.

FIG. 8A—Line Interface Module 332A

FIG. 8A illustrates an embodiment of line interface module 332A which is intended to operate with the modulation unit 315A of FIG. 7A.

As shown, line interface module 332A includes a POTS splitter 214 coupled to a first telephone outlet 640A and a DSL modem 620. The DSL modem 620 is further coupled to a framer 625. The framer 625 is further coupled to control logic 636, V.90 modem 635, subscriber line circuitry 630, shown as SLAC/RSLIC 630, a wireless access point 655, and an Ethernet transceiver 645. The V.90 modem 635 and the SLAC/RSLIC 630 are further coupled to a second telephone outlet 640B. The Ethernet transceiver 645 is further coupled to a network outlet 650.

Line interface module 332A receives the POTS telephony signals and integrated data stream over two-wire telephone line 120A. POTS splitter 214 receives the POTS telephone signal plus the integrated data stream and splits off the POTS telephone signal directly to telephone output or jack 640A. The integrated data stream is supplied from the POTS splitter 214 to a digital transceiver such as DSL modem 620. The DSL modem 620 provides the integrated data stream to a framer 625, which may include a processor such as the processor 520 shown in FIG. 5A in the modulation unit 315. The framer 625 provides telephony signals to a subscriber line access circuit and ringing subscriber line interface circuit (SLAC/RSLIC) 630. The SLAC/RSLIC 630 is configured to convert the digital telephony signals to analog telephony signals and provide the converted analog POTS telephone signals to telephone output 640B. The SLAC/RSLIC 630 is also configured to provide the ring signal to a telephone coupled to telephone output 640B, upon receiving a telephone call intended for that telephone number.

The framer 625 is further configured to provide the data traffic to Ethernet transceiver 645 which is then configured to provide the data traffic to output 650 for data processing equipment 336, such as computer 336 shown previously.

Line interface module 332A may further include a wireless access point 655 coupled to the framer 625. The wireless access point 655, when present, is configured to provide wireless access, e.g. Ethernet, to the integrated telephone and data system through the framer 625. The wireless access point 655 provides for short range wireless communications. The wireless access point 655 may operate in conjunction with the system described in U.S. Pat. No. 5,835,061.

Line interface module 332A may also include a V.90 modem 635 coupled to the framer 625 and the telephone output port 640B. The V.90 modem 635 is also coupled to control logic 636. The control logic 636 is further coupled to the framer 625.

In one embodiment, an external modem in an external communications device or data processing device may input modem signals to telephone output 640B. Either upon receiving modem recognition signals or upon being signaled directly, internal V.90 modem 635 responds to the recognition signals of the external modem. The external modem and the internal V.90 modem 635 may then negotiate and train to a maximum or optimal transfer rate for modem data between the external modem and the internal V.90 modem 635. The V.90 modem 635 will then provide the modem signals to the framer 625 for repackaging and transfer over the two-wire telephone line 120A by the DSL modem 620. In this configuration, according to this embodiment, the external V.90 modem is capable of communicating with a distant network device over network 205 at the maximum rate allowed between the external modem and the internal V.90 modem 635. The short distance between the external modem and the internal V.90 modem 635 may advantageously provide for optimum transfer and maximum transfer rates during all use, such as guaranteed 56 kbps for a 56 k modem.

Figure 8B:
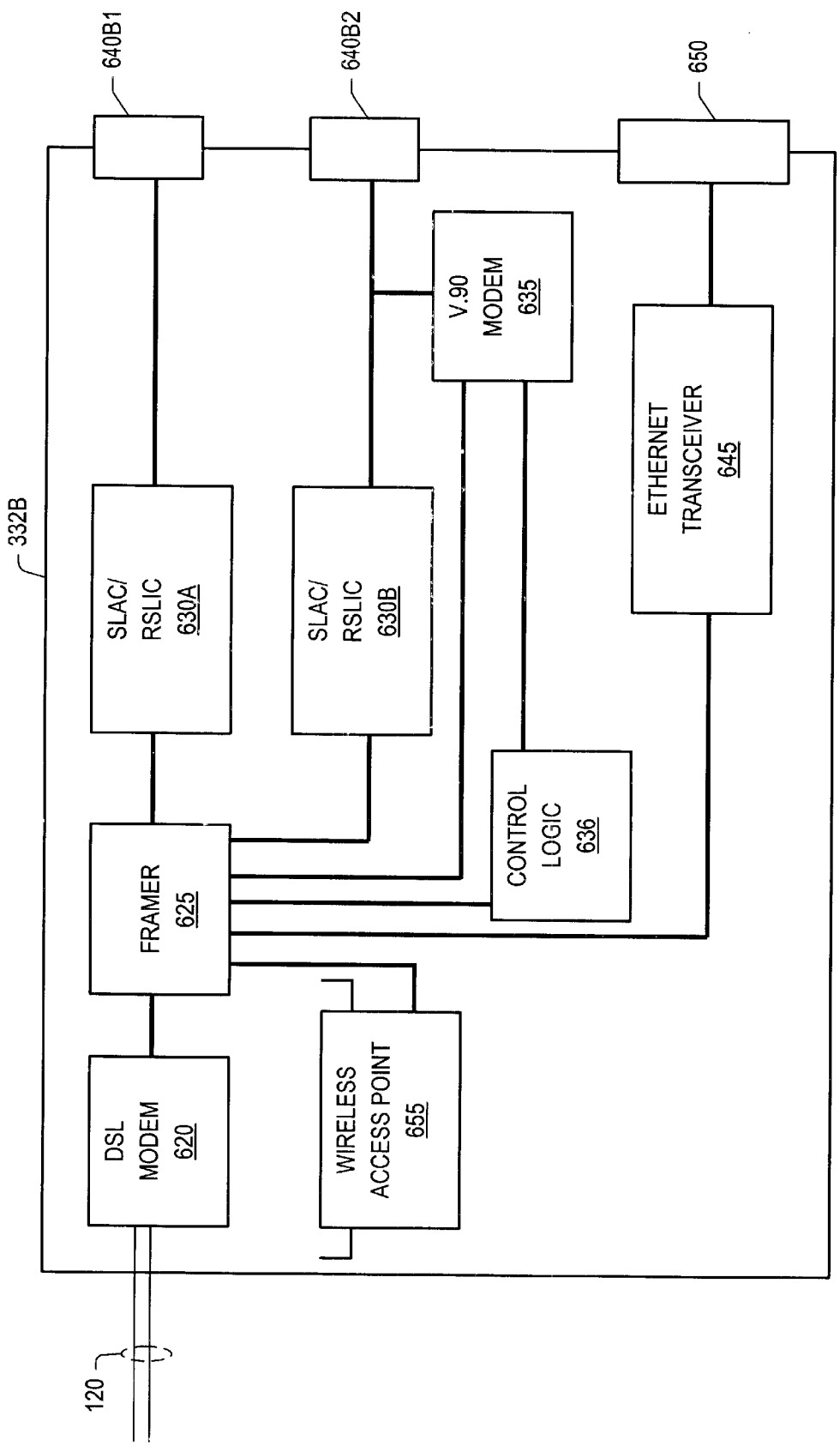
FIG. 8B is a block diagram of an alternative embodiment of the line interface module of FIG. 6, corresponding to the modulation unit of FIG. 7B, that supports the plurality of telephony voice channels and the high speed data network connection over the two-wire communications channel, with all of the telephony voice channels being transmitted digitally in an integrated data stream.

FIG. 8B—Line Interface Module 332B

FIG. 8B illustrates an alternate embodiment of the line interface module 332B which is intended to operate with the modulation unit 315B of FIG. 7B. This embodiment of line interface module 332B is configured to accept completely integrated telephony and data signals and to provide the appropriate telephony signals or data signals to an appropriate output as desired.

As shown, line interface module 332B includes a DSL modem 620 coupled to line 120A. The DSL modem 620 is further coupled to a framer 625. The framer 625 is further coupled to first SLAC/RSLIC 630A, second SLAC/RSLIC 630B, control logic 636, V.90 modem 635, a wireless access point 655, and an Ethernet transceiver 645. The first SLAC/RSLIC 630A is further coupled to first telephone outlet 640B1. V.90 modem 635 and the SLAC/RSLIC 630B are further coupled to a second telephone outlet 640B2. The Ethernet transceiver 645 is further coupled to a network outlet 650.

In this embodiment, a completely integrated voice and data signal is transferred digitally over the two-wire telephone line 120A and delivered to a DSL modem 620 in the line interface module 332B. The DSL modem 620 then provides the integrated voice and data stream to a framer 625, which may include the processor 520 discussed above with respect to FIG. 5A. The framer 625 routes the input data to the appropriate destination. The appropriate destinations include the following. First, subscriber line access circuit and ringing subscriber line interface circuit 630A is configured to receive digital telephony signals and to convert the digital telephony signals into analog telephony signals and output the converted analog telephony signals to telephony output 640B1. Second, subscriber line access circuit and ringing subscriber line interface circuit 630B is configured to receive the second set of digital telephony signals and to convert the second set of digital telephony signals into a second set of converted analog telephony signals and output same to output 640B2. Fourth, V.90 modem 635 may receive modem signals destined for telephone output 640B2. Framer 625 may also provide control signals to and from control logic 636 including those destined for V.90 modem 635. Third, data packets from network 205 may be provided to Ethernet transceiver 645 for transmission to data output 650. Fifth, data destined for wireless transmission may be provided to wireless access point 655. The internal V.90 modem 635 included in line interface module 332B is also configured to receive modem signals from an external V.90 modem coupled to telephone output 640B2 similar to the internal V.90 modem 635 in line interface module 332A.

Figure 8C:
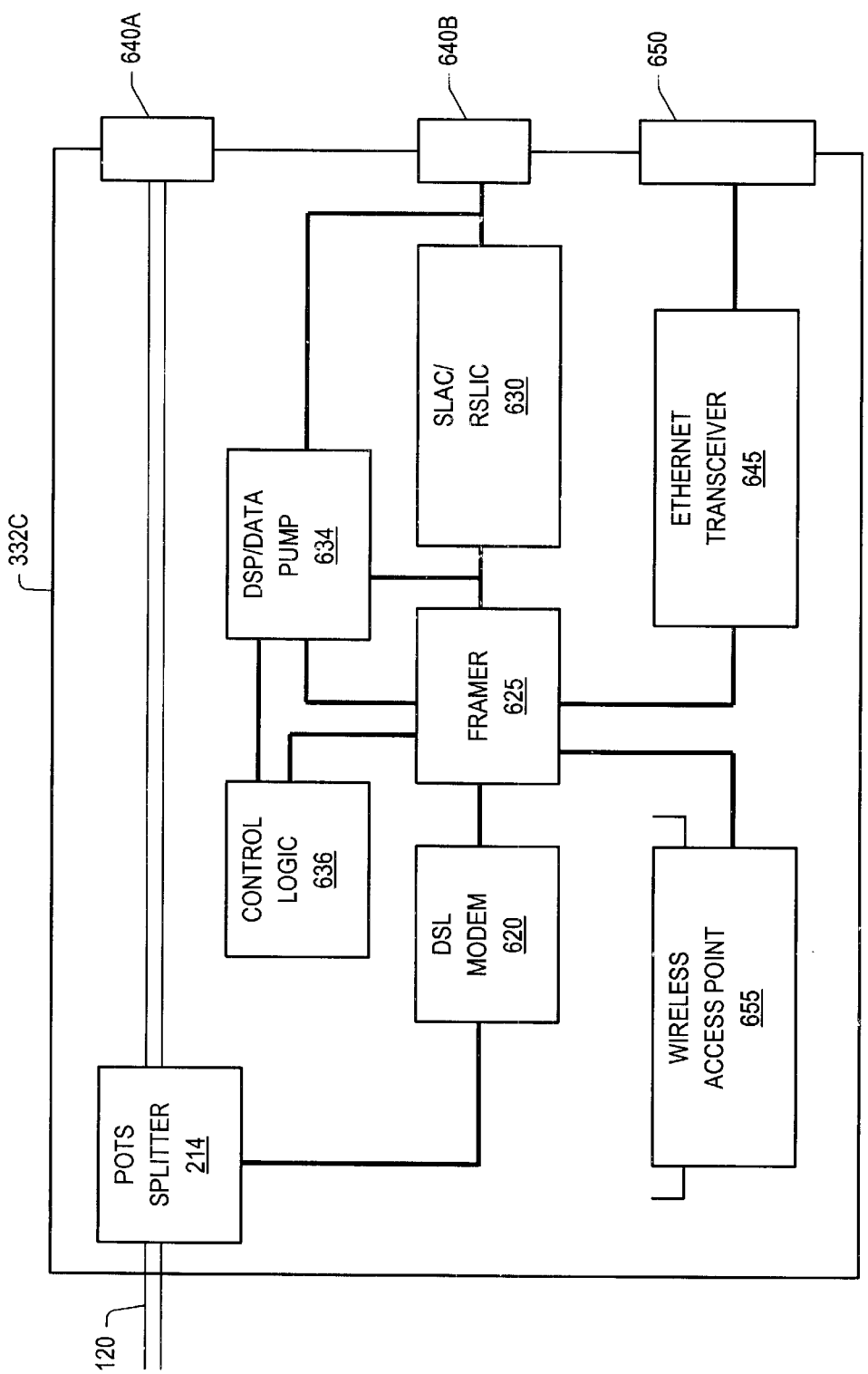
FIG. 8C is a block diagram of an alternative embodiment of the line interface module which utilizes the A/D logic in the subscriber line circuit for voice as well as modem functions.

FIG. 8C—Line Interface Module 332C

FIG. 8C illustrates an alternate embodiment of either of line interface modules 332A or 332B which eliminates the A/D converter comprised in modem 635. In this embodiment, internal modem 635 is replaced with a DSP 634 which performs the digital functions of modem 635, including the data pump function. In this embodiment, input signals intended for the internal modem 635 are first provided to subscriber line circuit for analog to digital conversion, and then are provided to data pump (DSP) 634. This removes the A/D converter in the modem, thus reducing the cost of the line interface module.

Figure 9:
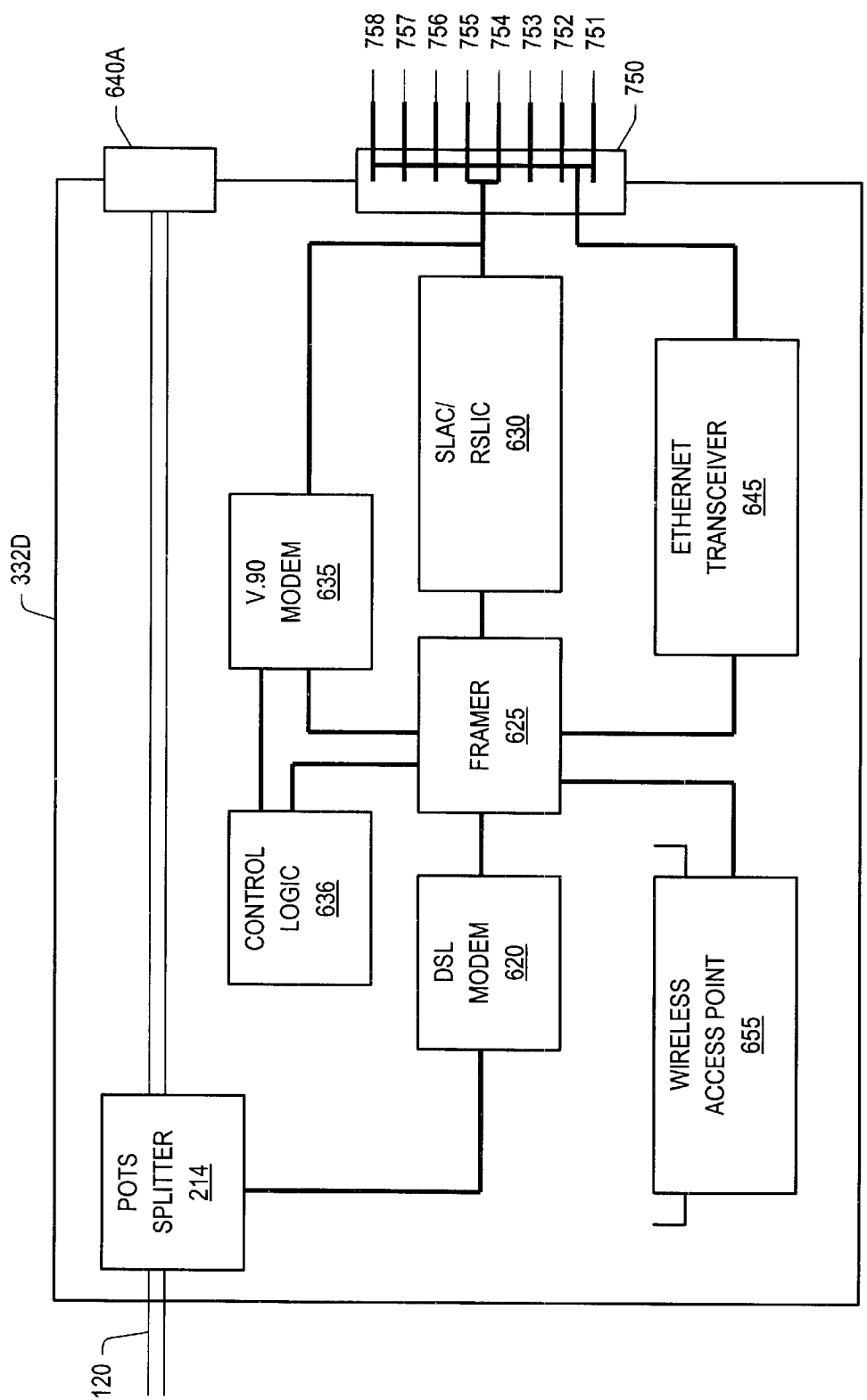
FIG. 9 is a block diagram of a line interface module that includes an integrated telephone jack and data jack.

FIG. 9—Line Interface Module 332D with Single Data Jack

FIG. 9 illustrates an additional embodiment of line interface module, referred to as 332D. Elements in FIG. 9 which are similar or identical to those in FIGS. 8A–8B have the same reference numerals for convenience. Line interface module 332D is similar or identical in most respects to line interface modules 332A–332C, except that, in this embodiment, line interface module 332D includes a multipurpose data outlet 750 for transfer of one or more of telephony, modem, and network data traffic. It is noted that the multipurpose data outlet 750 may be included on any of the line interface modules 332A–332C, as desired, and thus the configuration and/or selection of logic blocks shown in FIG. 9 is exemplary only.

As shown, the ports 640B and 650 are replaced with a single data outlet 750. Thus, in the embodiment shown in FIG. 9, line interface module 332D includes two output ports 640A and 750. In a preferred embodiment, telephone output port 640A includes an RJ-11 jack capable of receiving an RJ-11 connector for providing telephony signals to a telephone, such as telephones 334A and 334B shown previously.

Output port 750 is preferably an RJ-45 jack configured to receive either an RJ-11 connector or an RJ-45 connector. The single data outlet 750 may be coupled to the modem 635, the subscriber line circuit 630, and the Ethernet transceiver 645. The data outlet 750 includes eight electrical connections or pins labeled 751–758. Pins 754 and 755 are electrically connected to the V.90 modem 635 and the SLAC/RSLIC 630. Pins 751–753 and pins 756–758 are electrically connected to Ethernet transceiver 645. Operation of various ones of pins 751–758 depends on the particular wiring plug inserted into data outlet 750. Thus, line interface module 332D is operable to selectively provide data or telephone signals from output port 750 to either the V.90 modem 635 and SLAC/RSLIC 630 or to Ethernet transceiver 645, depending on the type of connector inserted into the output port 750.

FIG. 10—Face Plates

FIG. 10 illustrates three embodiments of a face plate for line interface modules 332A–C, such as the face plate as one might see on the outside of telephone junction box, e.g. a J box, at a user location. Face plate embodiment 810 corresponds to the line interface module 332A described with respect to FIG. 8A. Face plate 820 corresponds to line interface module 332B illustrated in FIG. 8B. Face plate 830 corresponds to line interface module 332C illustrated in FIG. 9.

In face plate embodiment 810, three input/output (I/O) ports are illustrated. First port 640A is shown as an RJ-11 jack with four available connection pins. The two innermost pins of port 640A are configured to provide POTS telephony signals (or POTS modem signals) to a telephone device connected to output port 640A. Output port 640B is shown as also including an RJ-11 jack with four connection pins. The two innermost pins provide telephony signals or modem signals which arrived at the line interface module 332C as digital signals. Output port 650 is shown as an RJ-45 jack with eight connection pins.

Face plate embodiment 820 includes three output ports. Output port 640B1 is shown as an RJ-11 jack configured to accept an RJ-11 plug. Telephone port 640B2 is also shown as an RJ-11 jack configured to accept an RJ-11 plug. Output port 650 is shown configured to accept an RJ-45 jack for providing Ethernet transmissions through line interface module 332C.

Face plate embodiment 830 includes two output ports, output port 640A and data output port 750. Telephony output port 640A is a POTS telephone output port shown as including an RJ-11 jack for receiving an RJ-11 telephone plug. Face plate 830 also includes a data output shown as an RJ-45 jack 750. RJ-45 jack 750 is configured to receive either an RJ-11 plug or an RJ-45 plug. When output port 750 receives an RJ-11 plug, output port 750 is configured to transfer telephony signals or modem signals over pins 4 and 5 of the eight pins shown. When output port 750 receives an RJ-45 plug, output port 750 is configured to receive Ethernet signals over pins 1–3 and 5, i.e., pins 751–753 and 756.

Figure 11A:
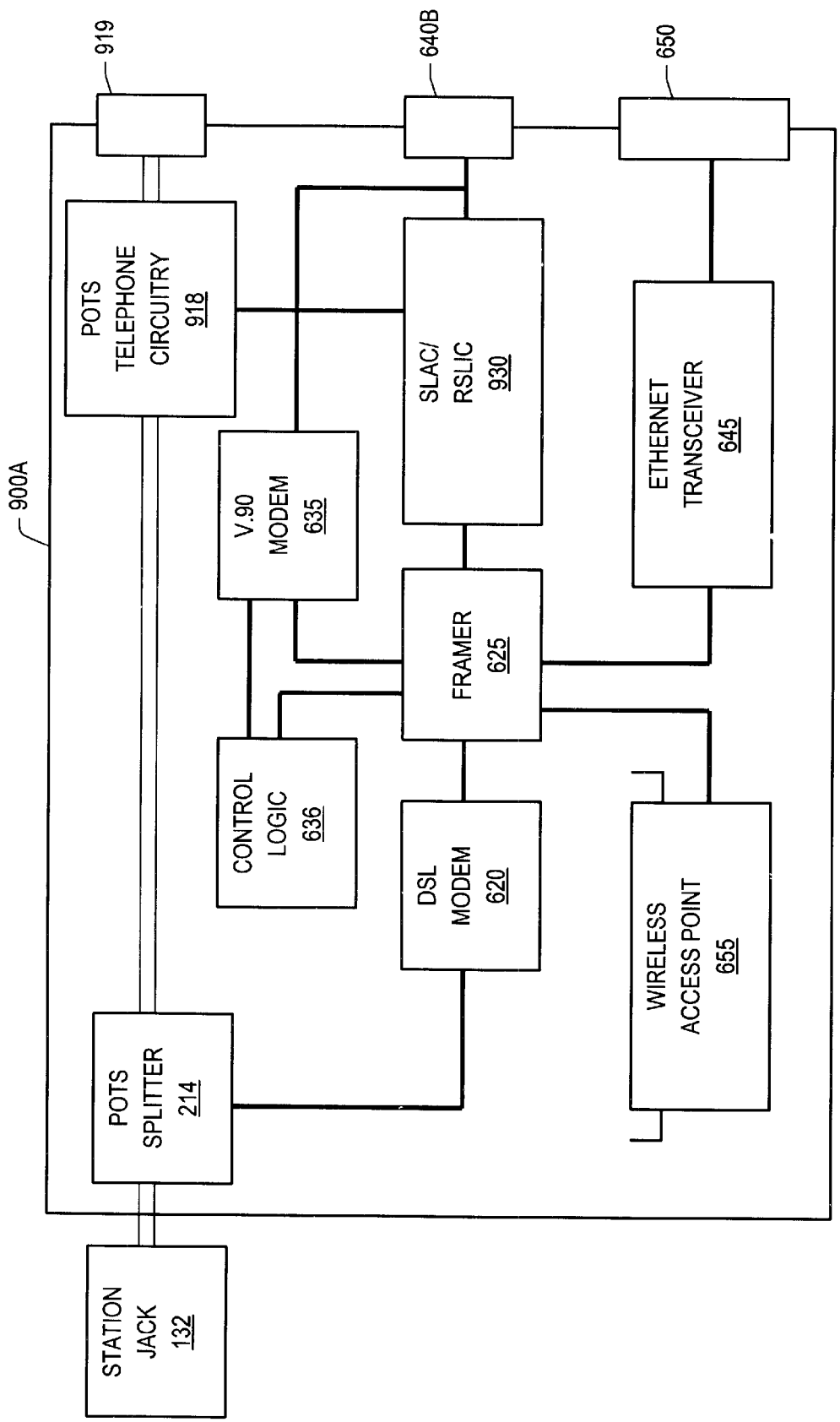
FIG. 11A is a block diagram of an embodiment of a telephony device that supports the plurality of telephone lines and the high speed data network connection over the two-wire communications channel, with one of the telephone lines being analog POTS.

FIG. 11A—Telephony Device 900A Including Line Interface Module Logic

FIG. 11A illustrates an embodiment of a telephony device 900A which includes or integrates the line interface module 332A of FIG. 8A. Thus, instead of incorporating line interface module 332A into the junction box (J box) of a station jack, the logic comprising the line interface module 332A is instead incorporated into telephony device 900A, i.e., is incorporated with standard telephony logic circuitry inside a telephony device.

As shown, telephony device 900A includes a POTS splitter 214 coupled to a station jack 132. Telephony device 900A also includes POTS telephony circuitry 918 coupled to the POTS splitter 214 and a telephone handset port 919. POTS splitter 214 is further coupled to a DSL modem 620. The DSL modem 620 is further coupled to a framer 625. The framer 625 is further coupled to control logic 636, V.90 modem 635, subscriber line circuitry 630, shown as SLAC/RSLIC 930, a wireless access point 655, and an Ethernet transceiver 645. The SLAC/RSLIC 930 is further coupled to the POTS telephony circuitry 918. The V.90 modem 635 and the SLAC/RSLIC 930 are further coupled to a second telephone outlet 640B. The Ethernet transceiver 645 is further coupled to a network outlet 650.

Telephony device 900A accepts the POTS plus integrated data stream provided over two-wire telephone line 120A from a station jack 132. A POTS splitter 214 receives the POTS telephone signal plus the integrated data stream and splits off the POTS telephone signal directly to POTS telephone circuitry 918. POTS telephone circuitry 918 preferably includes the DTMF generator, keypad, ringer, etc. associated with a POTS telephone. In another embodiment, the POTS telephone circuitry 918 may include the circuitry associated with a digital telephone. The POTS telephone circuitry 918 provides the POTS telephone signals to a telephone output 919 configured to couple to a telephone handset or other communications input/output device, e.g. a TTY machine.

The integrated data stream is supplied from the POTS splitter 214 to a digital transceiver such as DSL modem 620. The DSL modem 620 provides the integrated data stream to a framer 625, which may include a processor such as processor 520 shown above. The framer 625 provides telephony signals to a subscriber line access circuit and ringing subscriber line interface circuit (SLAC/RSLIC) 930. The SLAC/RSLIC 930 is configured to convert the digital telephony signals to analog telephony signals and provide the converted analog POTS telephone signals to telephone output 640. The SLAC/RSLIC 630 is also configured to signal the POTS telephone circuitry to announce a telephone call, e.g. by ringing, upon receiving a telephone call intended for the telephony device 900A.

The framer 625 is further configured to provide the data traffic to Ethernet transceiver 645 which is then provided to data output 650 for data processing equipment 336, such as computer 336 shown previously. Telephony device 900A may further include a wireless access point 655 coupled to the framer 625. The wireless access point, when present, is configured to provide wireless Ethernet access to the integrated telephone and data system through the framer 625. Telephony device 900A may also include a V.90 modem 635 coupled to the framer 625 and the telephone output port 640. The V.90 modem 635 is also coupled to control logic 636. The control logic 636 is further coupled to the framer 625.

In one embodiment, an external modem in an external communications device or data processing device may input modem signals from the external modem to telephone output 640. Either upon receiving modem recognition signals or upon being signaled directly, such as by control logic 636, the internal V.90 modem 635 responds to the recognition signals of the external modem. The external modem and the internal V.90 modem 635 may then negotiate and train to a maximum or optimal transfer rate for modem data between the external modem and the internal V.90 modem 635. The V.90 modem 635 will then provide the modem signals to the framer 625 for repackaging and transfer over the two-wire telephone line 120A by the DSL modem 620. In this configuration, according to this embodiment, the external V.90 modem is capable of communicating with a distant network device over net 205 at the maximum rate allowed between the external modem and the internal V.90 modem 635. The short distance between the external modem and the internal V.90 modem 635 may advantageously provide for optimum transfer and maximum transfer rates during all use.

Figure 11B:
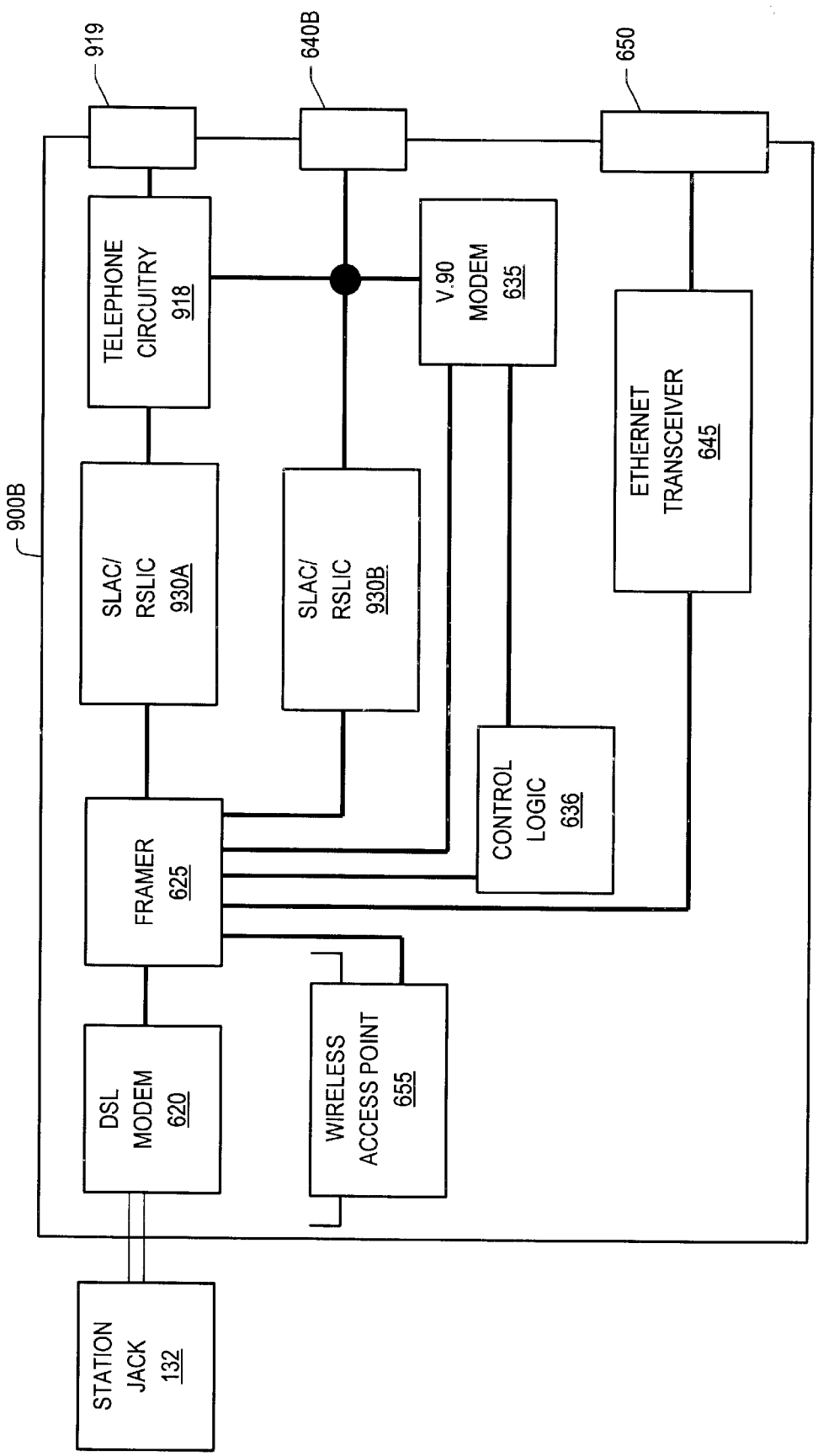
FIG. 11B is a block diagram of an alternative embodiment of a telephony device that supports the plurality of telephone lines and the high speed data network connection over the two-wire communications channel, with all telephone lines being transmitted digitally in an integrated data stream.

FIG. 11B—Telephony Device 900B Including Line Interface Module Logic

FIG. 1 1B illustrates an alternate embodiment of the telephony device 900B which includes or integrates the line interface module 332B of FIG. 6B. Thus, instead of incorporating line interface module 332B into the junction box (e.g. a J box), the logic comprising the line interface module 332B is instead incorporated into telephony device 900B, i.e., is incorporated with standard telephony logic circuitry inside a telephony device.

As shown, telephony device 900B includes a DSL modem 620 coupled to line 120A. The DSL modem 620 is further coupled to a framer 625. The framer 625 is further coupled to first SLAC/RSLIC 630A, second SLAC/RSLIC 630B, control logic 636, V.90 modem 635, a wireless access point 655, and an Ethernet transceiver 645. The first SLAC/RSLIC 930A and the second SLAC/RSLIC 930B are further coupled telephone circuitry 918. The telephone circuitry 918 is further coupled to a telephone handset port 919. V.90 modem 635 and the SLAC/RSLIC 930B are further coupled to a telephone outlet 640B. The Ethernet transceiver 645 is further coupled to a network outlet 650.

This embodiment of telephony device 900B is configured to accept completely integrated telephony and data signals and to provide the appropriate telephony signals or data signals to an appropriate output as desired. In this embodiment, a completely integrated voice and data signal is transferred digitally over the two-wire telephone line 120A and delivered to station jack 132. The DSL modem 620 in the telephony device 900B is coupled to the station jack 132 to receive the integrated data stream. The DSL modem 620 provides the integrated data stream to a framer 625, which may include the processor 520 discussed above. The framer 625 routes the digital data to the appropriate destination.

The appropriate destinations include the following: First, subscriber line access circuit and ringing subscriber line interface circuit (SLAC/RSLIC) 930A is configured to receive digital telephony signals and to convert the digital telephony signals into converted analog telephony signals and output the converted analog telephony signals to telephone circuitry 918. Telephone circuitry 918 preferably includes the DTMF generator, keypad, ringer, etc. associated with a POTS telephone. In another embodiment, the telephone circuitry may include the circuitry associated with a digital telephone. The telephone circuitry 918 provides the converted analog telephone signals to a telephone output 919 configured to couple to a telephone handset or other communications input/output device, e.g. a TTY machine.

Second, subscriber line circuit (SLAC/RSLIC) 630B is configured to receive the second set of digital telephony signals and to convert the second set of digital telephony signals into a second set of converted analog telephony signals and output same to output 640. Third, V.90 modem 635 may receive modem signals from the framer 625 destined for telephone output 640. Framer 625 may also provide control signals to and from control logic 636 including those destined for V.90 modem 635. Fourth, data packets from net 205 may be provided to Ethernet transceiver 645 for transmission to data output 650. Fifth, data destined for wireless transmission may be provided to wireless access point 655.

The internal V.90 modem 635 included in line interface module 332B is also configured to receive modem signals from an external V.90 modem coupled to telephone output 640B2, similar to the internal V.90 modem 635 in telephony device 900A.

Figure 11C:
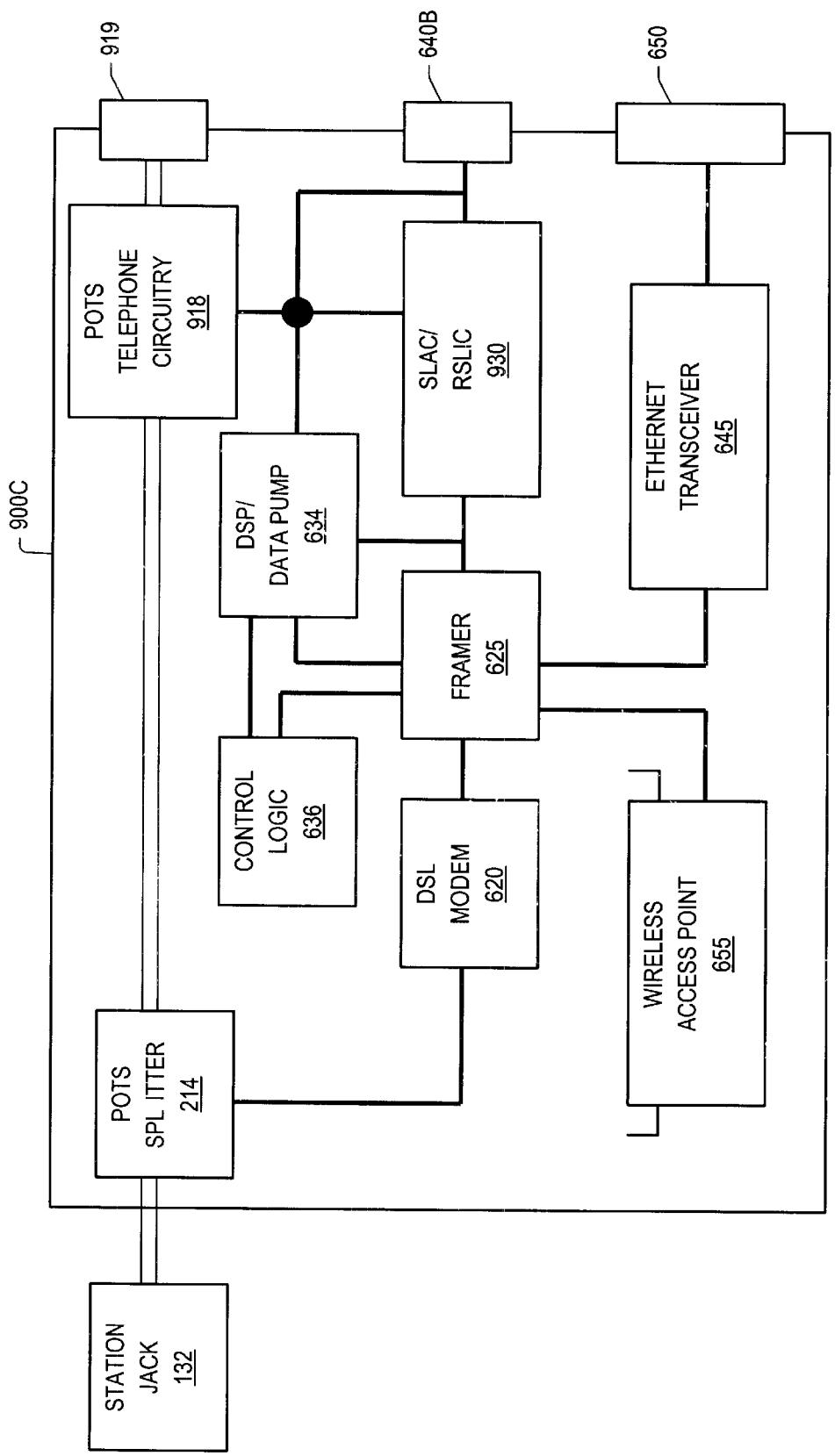
FIG. 11C is a block diagram of an alternative embodiment of the telephony device which utilizes the A/D logic in the subscriber line circuit for voice as well as modem functions.

FIG. 11C—Telephony Device 900C

FIG. 11C illustrates an alternate embodiment of either of telephony devices 900A or 900B which eliminates the A/D converter comprised in modem 635. In this embodiment, internal modem 635 is replaced with a DSP 634 which performs the digital functions of modem 635, including the data pump function. In this embodiment, input signals intended for the internal modem 635 are first provided to subscriber line circuit for analog to digital conversion, and then are provided to data pump (DSP) 634. This removes or obviates the necessity of the A/D converter in the modem, thus reducing the cost of the telephony device.

Figure 12:
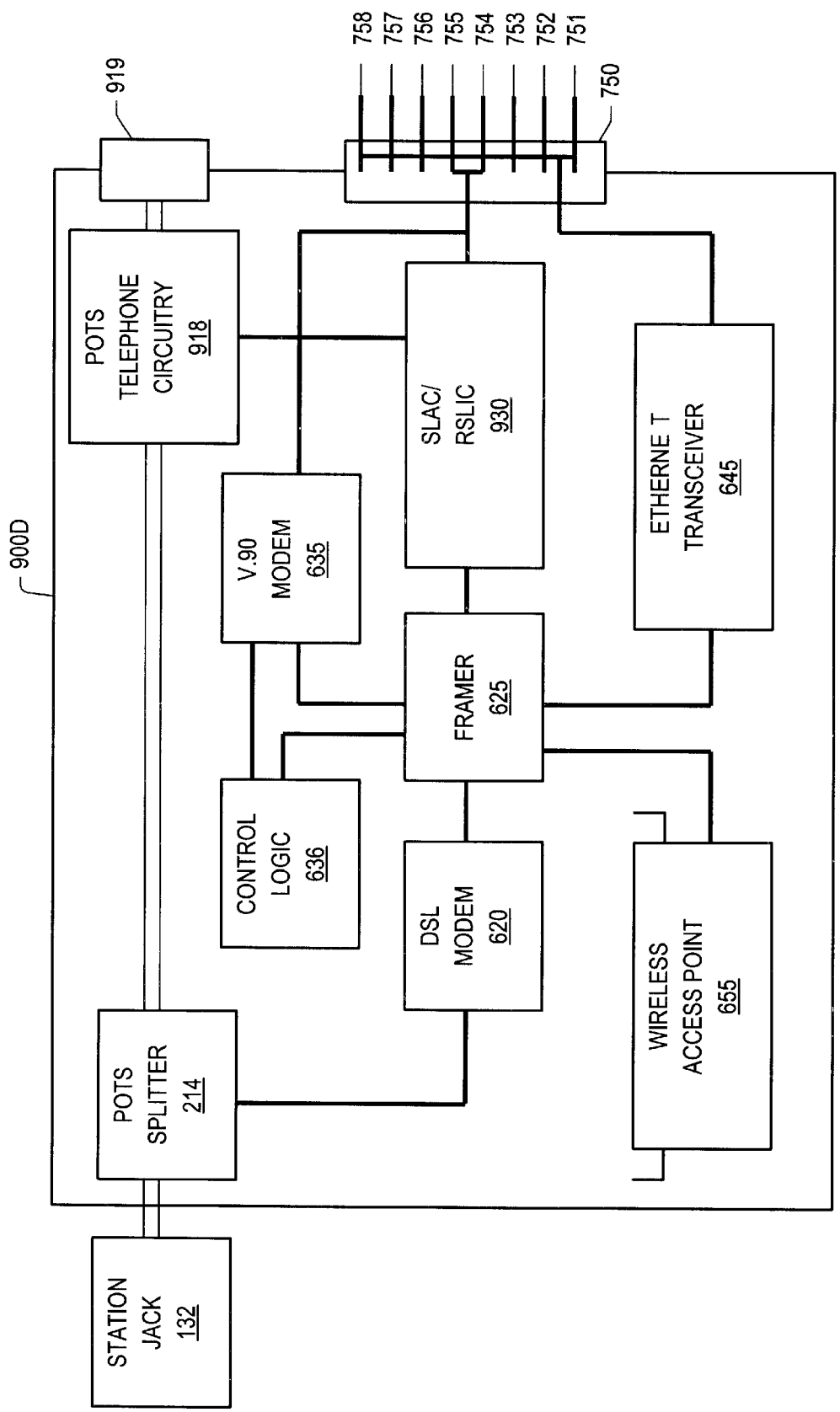
FIG. 12 is a block diagram of a telephony device that includes an integrated telephone jack and data jack.

FIG. 12—Telephony Device 900D Including Line Interface Module Logic

FIG. 12 illustrates an embodiment of a telephony device, referred to as 900D. Elements in FIG. 12 which are similar or identical to those in FIGS. 14A–11B have the same reference numerals for convenience. Telephony device 900D is similar or identical in most respects to telephony devices 900A–900C, except that, in this embodiment, line interface module 900D includes a multipurpose data outlet 750 for transfer of one or more of telephony, modem, and network data traffic. It is noted that the multipurpose data outlet 750 may be included on any of the telephony devices 900A–900C, as desired, and thus the configuration and/or selection of logic blocks shown in FIG. 12 is exemplary only.

As shown, the ports 640B and 650 are replaced with a single data outlet 750. Thus, in the embodiment shown in FIG. 9, telephony device 900D includes a handset port 919 and a port 750. Output port 750 is preferably an RJ-45 jack configured to receive either an RJ-11 connector or an RJ-45 connector, as described above with respect to the discussion of FIG. 9.

Figure 13:
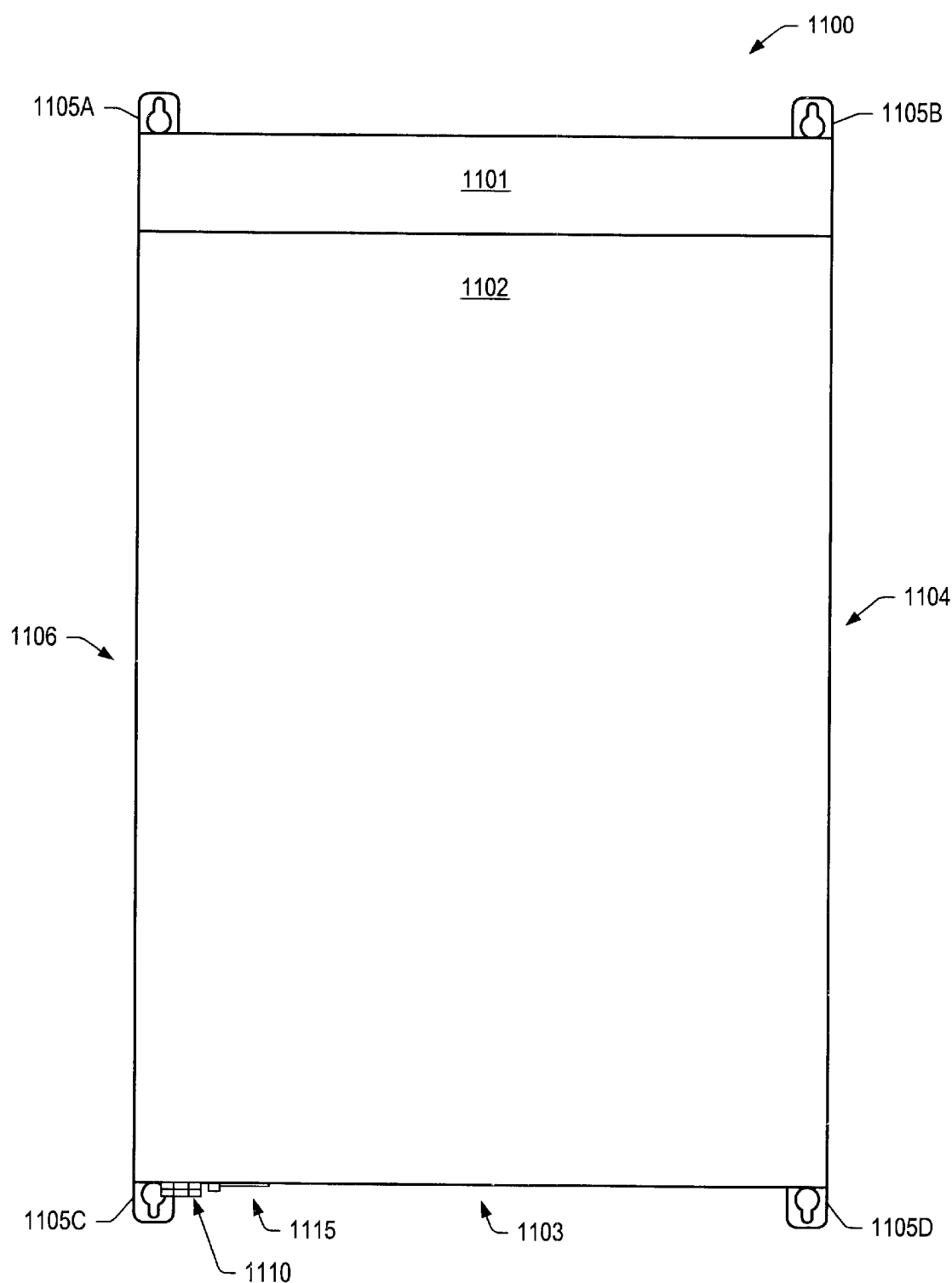
FIG. 13 is a line drawing of an embodiment of a front view of a housing for a modulation unit.

FIG. 13—Modulation Unit Housing Front View

FIG. 13 illustrates an embodiment of a front view of housing 1100 for an alternative embodiment of modulation unit 315C. As shown, the housing 1100 includes a slanted top portion of the cover 1101 and a flat front portion of the cover 1102. Housing 1100 also includes four mounting brackets 1105A-1105D. The only other features visible from a front on view are the air exhaust port 1110 for a cooling fan and connection 1115 for power input to the modulation unit 315C. The air exhaust port 1110 for the fan and the connection 1115 for power input are located on the bottom 1103 of the housing 1100.

Figure 14:
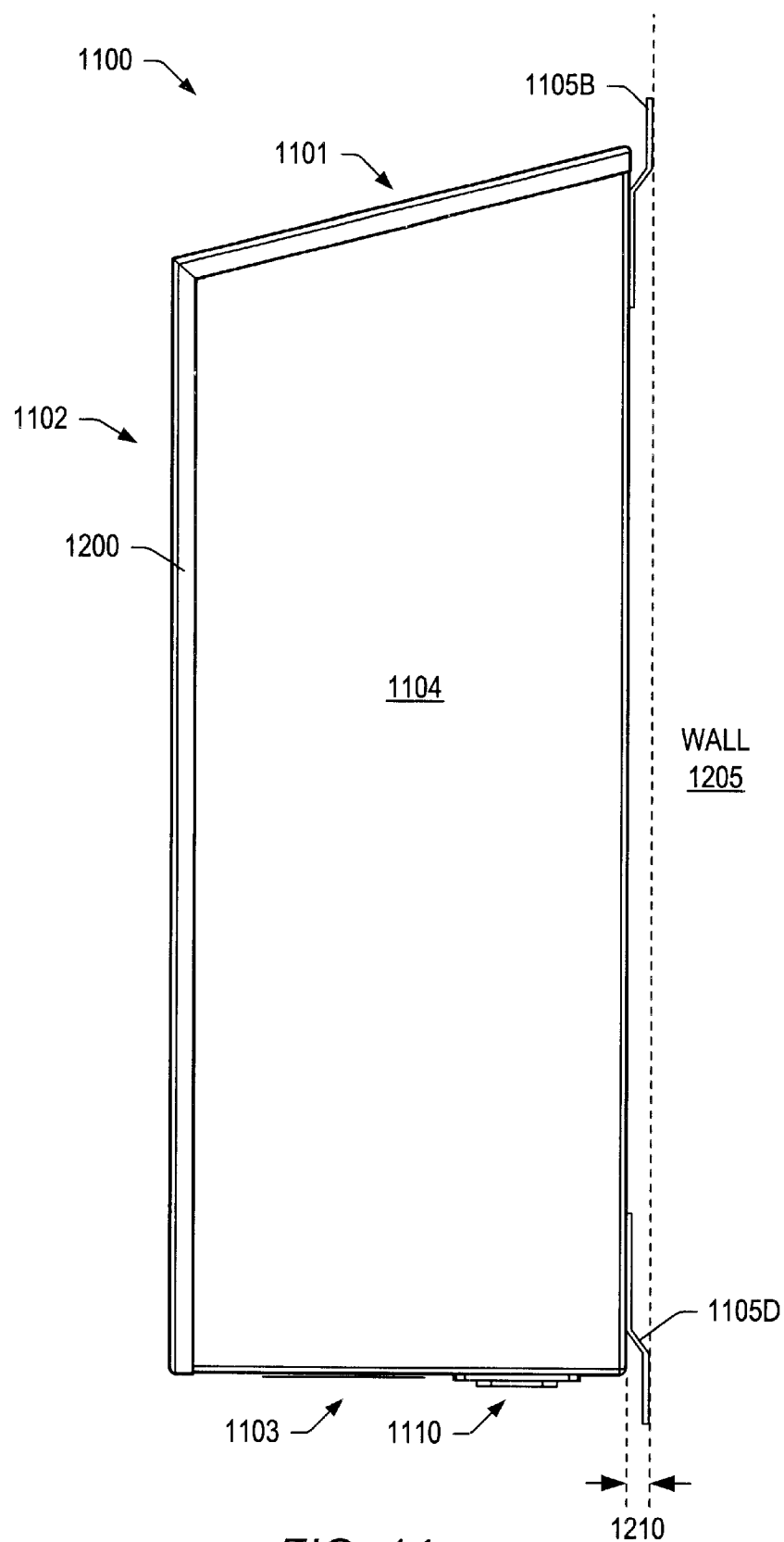
FIG. 14 is a line drawing of an embodiment of a side view of a housing for a modulation unit.

FIG. 14—Modulation Unit Housing Side View

FIG. 14 is a side view showing side 1104 of the housing 1100. The relative locations of the slanted top 1101 and the flat front 1102 of the housing 1100 are shown. It is noted that the slanted top 1101 and the flat front 1102 are preferably included as a unified cover 1200 of the housing 1100. The relative location of the bottom 1103 of the housing 1100 and the air exhaust port 1110 of the fan are also shown. Note that mounting brackets 1105B and 1105D shown in FIG. 12 stand off from the back side of the housing 1100. This allows for a gap 1210 between the housing 1100 and a wall 1205 to which the housing 1100 is mounted. Gap 1210 preferably allows for a convection chimney between the housing 1100 and the wall 1205. As heat radiates from the back of the housing 1100, the air in the gap 1210 is heated, expands and moves upward. The gap 1210 draws in cool air from the bottom of the housing 1100, cooling the housing 1100 from the bottom as the warmer air is expelled out the top of the gap 1210. In a preferred embodiment, the width of gap is approximately ⅜ inch.

Figure 15:
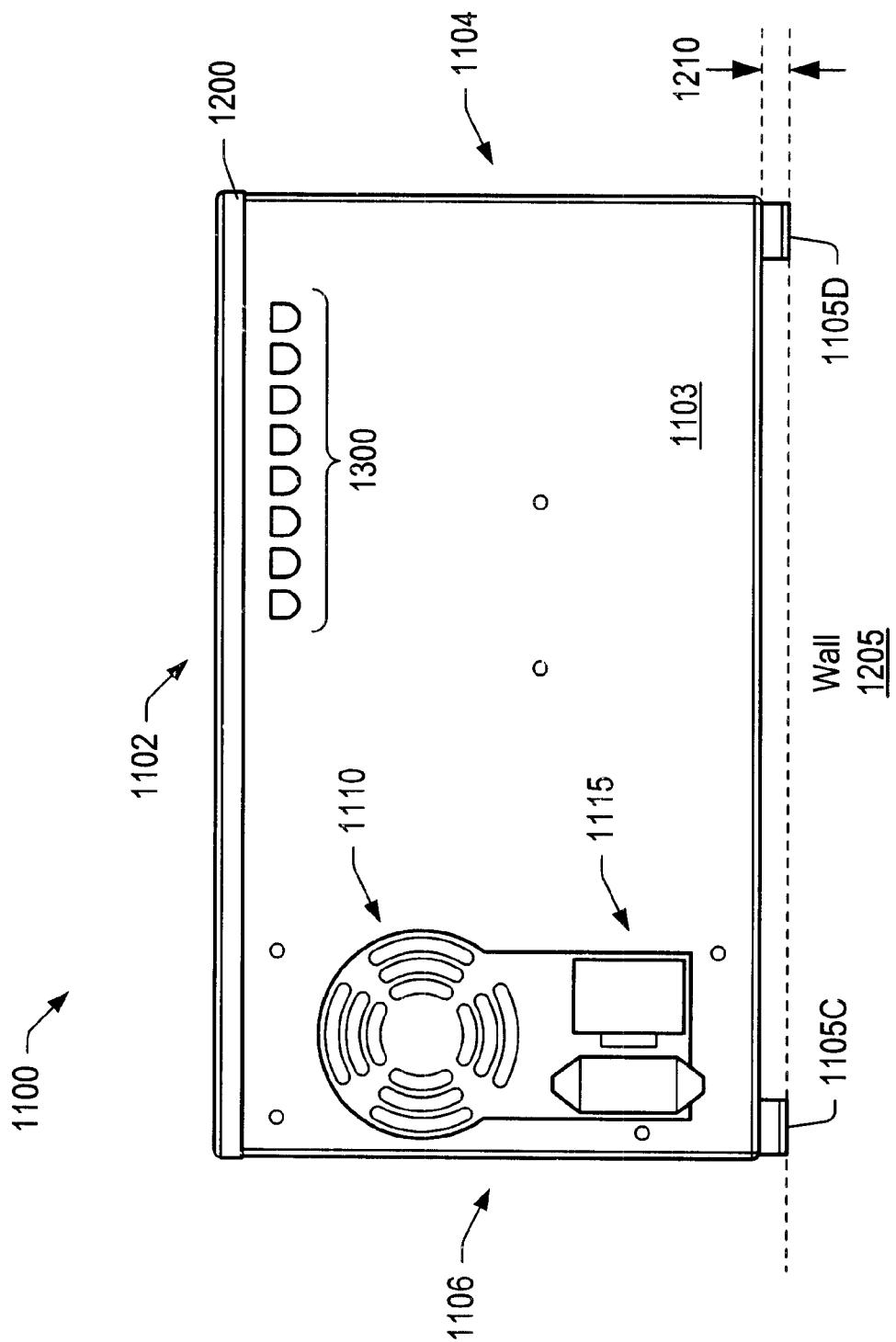
FIG. 15 is a line drawing of an embodiment of a bottom view of a housing for a modulation unit.

FIG. 15—Modulation Unit Housing Bottom View

FIG. 15 illustrates the features visible from a bottom view of the housing 1100. The relative locations of the flat front 1102, the side 1104 illustrated in FIG. 14, the opposite side 1106, and the back of the housing 1100 are shown in FIG. 15. The location of mounting brackets 1105C and 1105D and the gap 1210 between the housing 1100 and the wall 1205 are also shown. The features of the bottom 1103 of the housing 1100 include the following: The relative location of the air exhaust port 1110 for the fan is illustrated. The relative location of the power input connector 1115 is also shown. In the upper right of the bottom side 1103, a plurality of routing passages 1300 is shown. Routing passages 1300 are shown with a rounded bottom and a flat top. In a preferred embodiment routing passages 1300 are filled with a cable routed through an individual Routing passage 1300 and a pliable space-filling material for providing a substantially airtight seal around each of the cables. The cables and the pliable space-filling material are secured to slow air exchange between the inside and the outside of the housing to an insubstantial amount. It is noted that eight routing passages 1300 are illustrated to correspond to eight line cards that are preferably resident inside the housing 1100. The line cards will be described below with respect to FIGS. 22–23.

Figure 16:
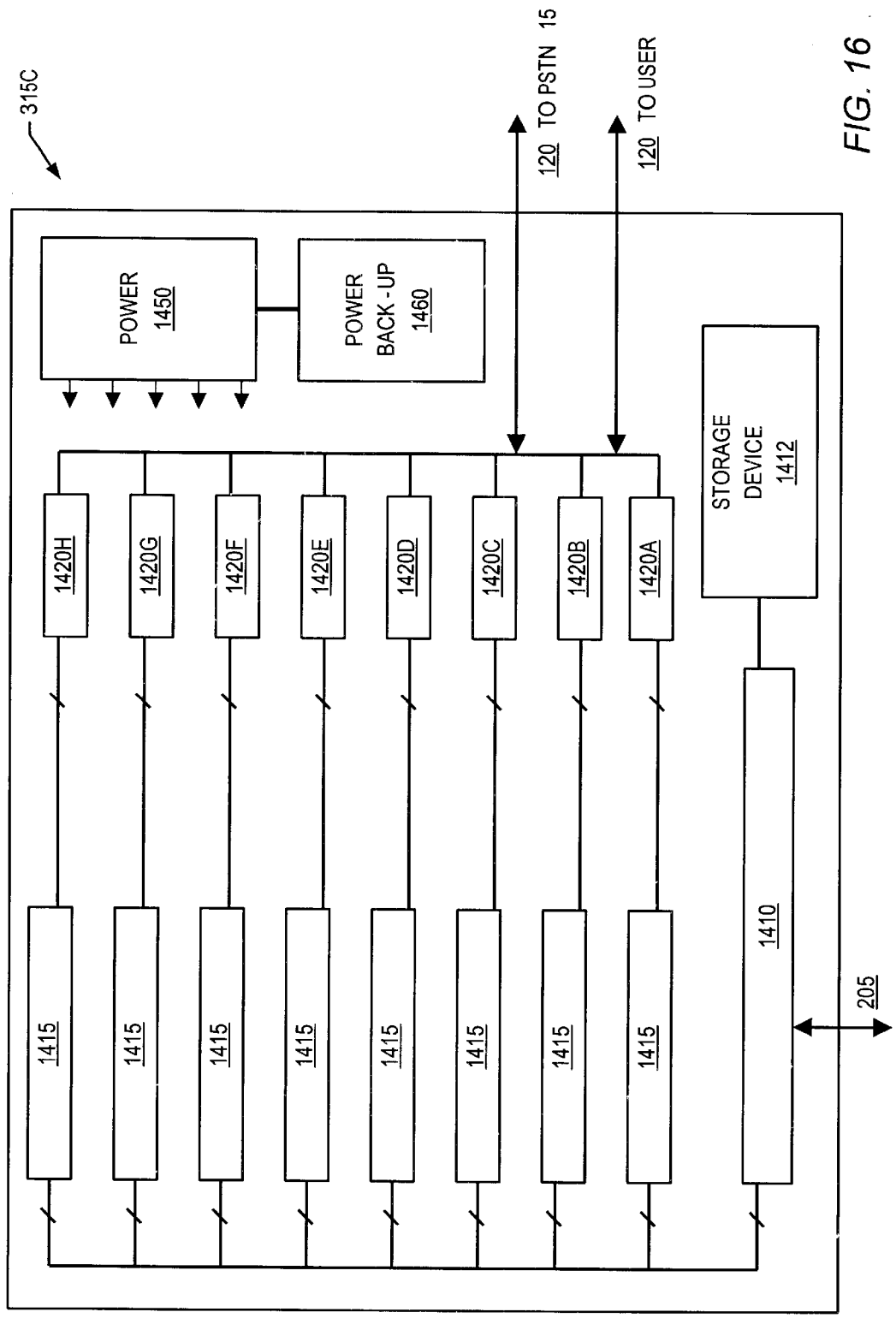
FIG. 16 is a block diagram of an embodiment of the electrical connections of an alternative embodiment of a modulation unit.

FIG. 16—Modulation Unit 315C

Figure 17:
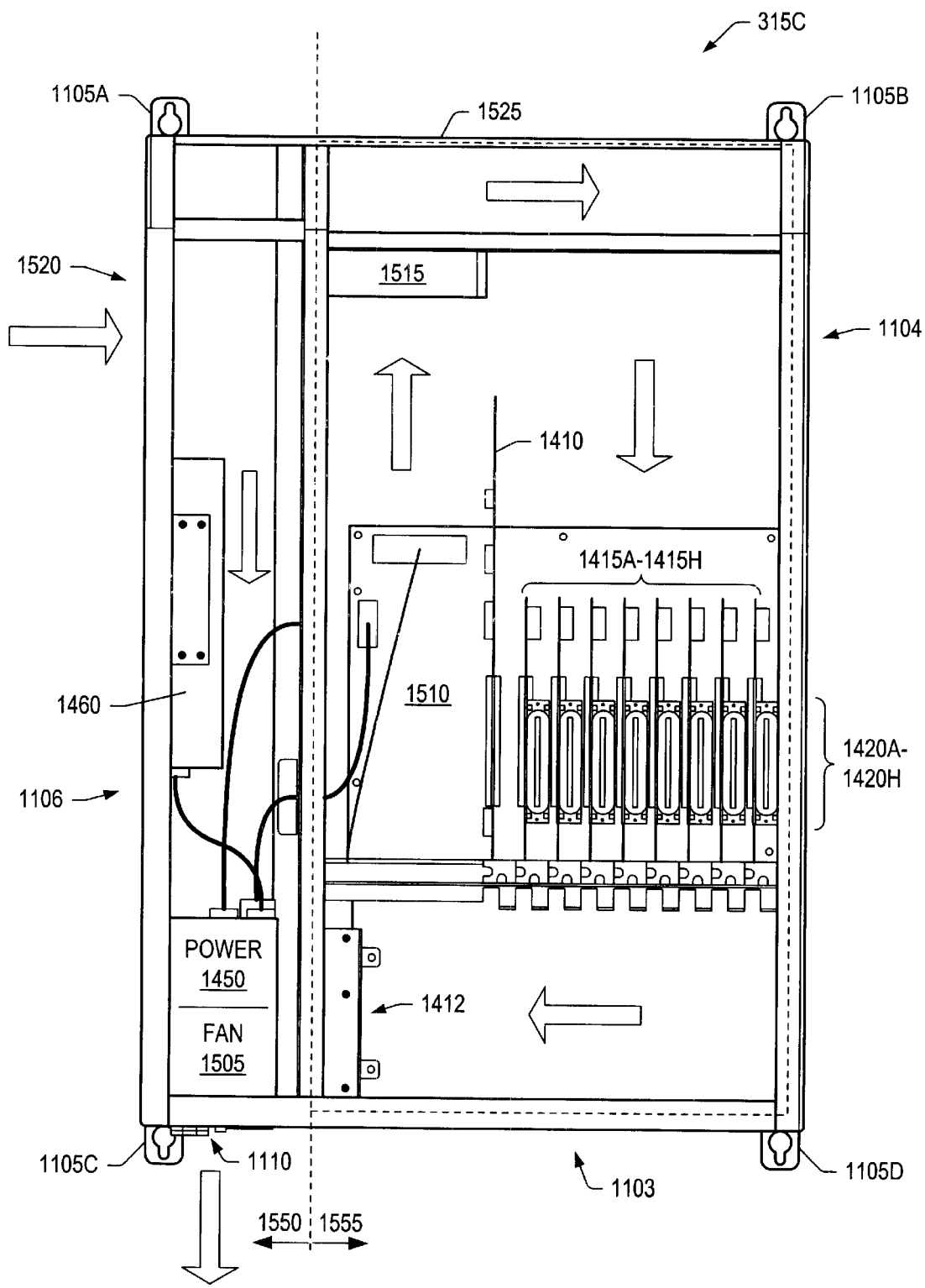
FIG. 17 is a block diagram of a top view of an embodiment of the alternative embodiment of a modulation unit inside and including the housing of FIGS. 13–15.
Figure 18:
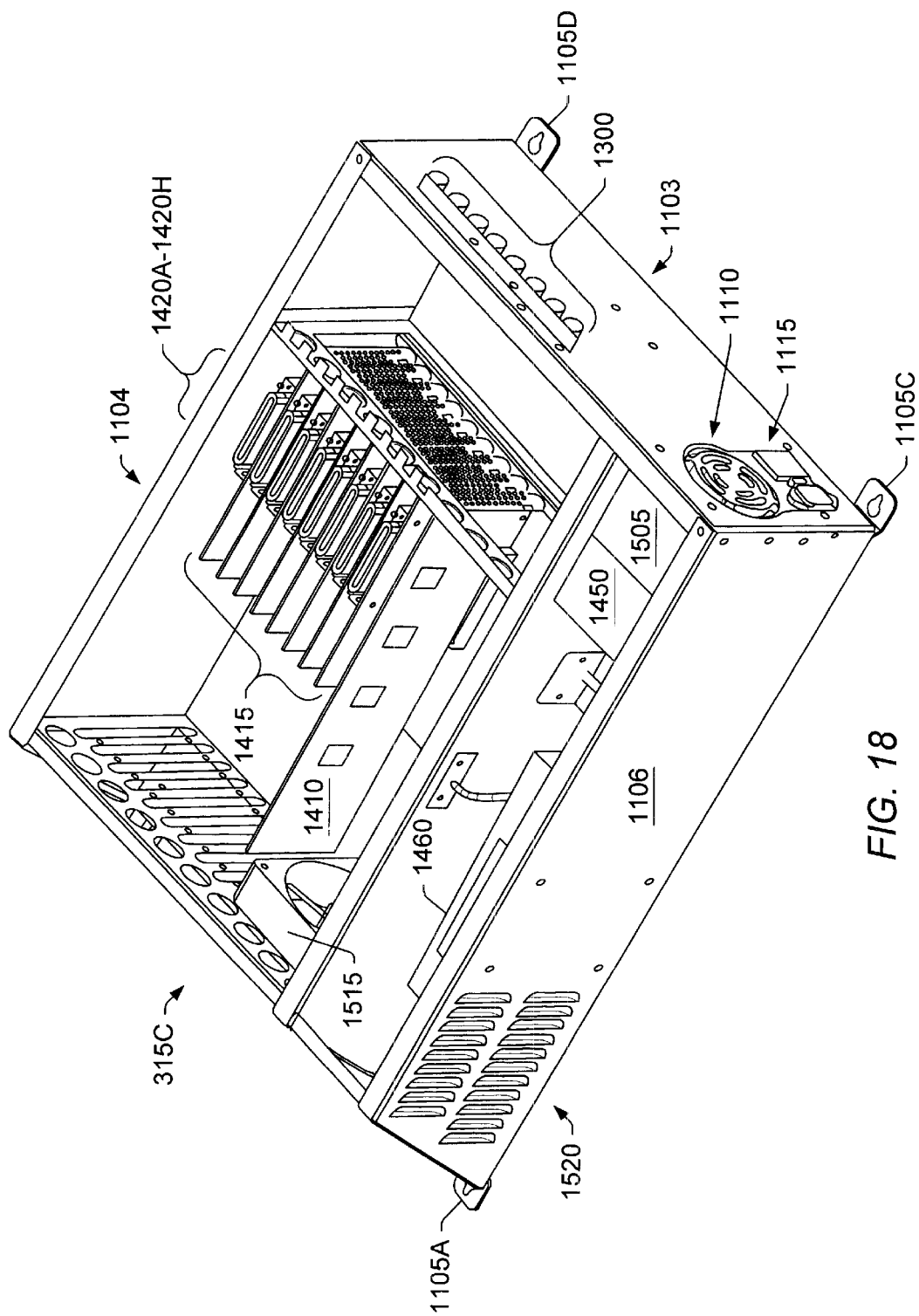
FIG. 18 is an illustration of a lower left prospective view of an embodiment of the alternative embodiment of a modulation unit inside the housing of FIGS. 13–15.

FIG. 16 illustrates an embodiment of the components and electrical/communication signal routing of modulation unit 315C, preferably housed in housing 1110 shown above with respect to FIGS. 13–15 above, and as shown in FIGS. 17–18 below.

As shown, modulation unit 315C in FIG. 16 includes a smart card 1410 coupled to the network 205 for receiving properly routed and formed Ethernet packets. A plurality of signal lines couple the smart card 1410 to a plurality of line cards 1415A–1415H. Each line card 1415A–1415H is coupled through a plurality of signal lines to an I/O connector 1420A–1420H for receiving POTS telephone signals over line 120 from the PSTN 105 and for receiving voice and/or data signals over line 120 from the user location. A storage device 1412 may be coupled to the smart card 1412. Power is provided as required by a power supply 1450 and optionally by power back-up 1460.

In the illustrated embodiment, telephone signals are provided to smart card 1410 over line 120 from the PSTN 105. Digital network signals are also provided to smart card 1410 from the network 205. An embodiment of smart card 1410 will be described below with respect to FIG. 21. Smart card 1410 accepts power from the power supply 1450, which is backed up by power backup 1460, e.g. backup battery. Smart card 1410 preferably accepts, in the illustrated embodiment, 32 signal lines, four each from the eight line cards 1415A–1415H. Smart card 1410 is also shown coupled to a storage device 1412, which may be embodied as a hard drive or as other appropriate storage device such as flash memory.

Line cards 1415A–1415H are also coupled to the power supply 1450. In the illustrated embodiment, the line cards 1415A-1415H each provide and are provided with digital network signals over four data lines each to smart card 1410. In addition, each line card 1415 is coupled by 48 signal lines to an I/O connector 1420, preferably one of the 50 pin connectors commonly referred to as "Amphenol connectors" and available from Amphenol Corp of Wallingford, Conn. Amphenol connectors are 50 pin connectors and are thus capable of receiving up to 50 electrical connections simultaneously. A plurality of Amphenol connectors 1420A–1420H are shown coupled to a plurality of two-wire telephone lines 120.

In the embodiment illustrated, each line card 1415 services 12 user locations, such as user locations 330 illustrated in FIG. 6 or user locations 430A–430C illustrated in FIG. 6A. As each line card 1415 needs two electrical connections for each two-wire telephone line 120 to the user location and 2 electrical connections for each incoming line 120 from the PSTN 105, each line card 1415 uses 48 of the 50 electrical connections in communicating through the Amphenol connectors 1420. Thus, 24 of the 48 are incoming lines to the line card 1415 and 24 of the 48 are outgoing integrated data streams over two-wire telephone lines 120A.

FIG. 17—Modulation Unit 315C inside Housing 1100

FIG. 17 illustrates an embodiment of modulation unit 315C shown from the front with the cover of the housing 1100 removed. The preferred locations of the various components of the modulation unit 315C are shown.

As shown, FIG. 17 includes housing 1100 divided into a left side 1550 and a right side 1555, divided by a dashed line down a vertical internal wall. The right side 1555 includes an enclosed portion 1525, shown enclosed in dashed lines. The relative locations of left side 1106, right side 1104, and bottom 1103 are noted. On the left side 1550, mounting brackets 1105A (upper) and 1105C (lower), air intake 1520, power back-up 1460, power 1450, fan 1505, and air outlet 1110 are shown. On the right side 1555, outside of enclosed portion 1525, mounting brackets 1105B (upper) and 1105D (lower) are shown. On the right side 1555, inside enclosed portion 1525, fan 1515, motherboard 1510, smart card 1410, line cards 1415A–1415H, and storage device 1412 are shown.

The large arrows in FIG. 17 illustrate the direction of airflow in the two compartments (i.e. sides) of the housing 1100 of the modulation unit 315C. The left side of the modulation unit 315C housing 1100 is designated 1550 by the arrow to the left of the dashed line running top to bottom of the figure. Note that air is drawn in through an air intake 1520 on side 1106 of the housing 1100. Cooling air is pulled downward through the left half 1550 of the housing 1100 by fan 1505 at the base of the left side 1550. Exhaust from the fan 1505 is through air outlet 1110 on the bottom 1103 of the housing 1100. The relative location of the power supply 1450 and the power backup 1460 are shown in the left side 1550 of the housing 1100. Note that the cooling air taken in at air intake 1520 first passes by the heat generating power backup 1460 which is located on the inner side of the outer wall 1106 of the housing 1100 away from the active components inside the right side 1555 of the housing 1100. The warmed cooling air is now passed over the power supply 1450 before being exhausted by the fan 1505 out exhaust port 1110 at the bottom 1103 of the housing 1100. The left side 1550 of the housing 1100 is preferably the only portion of the housing 1100 that is open to the outside air.

The right side 1555 of the housing 1100 contains a storage compartment, which is substantially airtight. The airtight portion of the housing 1100 is shown within the dashed lines designated by reference numeral 1525. Inside the airtight portion 1525, air flow is in a clockwise fashion, optionally driven by a fan 1515. Storage device 1412 rests on the dividing wall between 1550 and 1555, so as not to obstruct airflow. Smart card 1410 and the line cards 1415A–1415H are shown in their respective locations coupled to a motherboard 1510. Power is provided from power supply 1450 to the motherboard 1510 through a cable which passes through a substantially airtight seal in the internal dividing wall between the left half 1550 and the right half 1555 of the housing 1100.

In a preferred embodiment, smart card 1410 and the line cards 1415A–1415H couple to the motherboard 1510 through connectors which are mechanically equal to PCI connectors (i.e. mechanically adhere to the Peripheral Component Interconnect specification), but are electrically different. The locations of the Amphenol connectors 1420A–1420H on the line cards 1415A–1415H are illustrated. It is noted that in the preferred embodiment, the active components are mounted on the "wrong" side of the smart card 1410 and on the "right" side of the line cards 1415A–1415H. By "wrong" side, it is meant that the PCI card convention of placing the active devices on the right side of the card when holding the mounting bracket in front of you with the card extending away is not followed. This configuration of mounting the active components on the "wrong" side of the smart card 1410 may advantageously allow for better convective air flow, either natural or forced, through the sealed portion 1525 of the housing 1100. Note that as shown, cooling air is drawn by fan 1515 over the active components of the smart card 1410, directly.

FIG. 18—Lower Left Perspective View of Modulation Unit 315C inside Housing 1100

FIG. 18 illustrates a lower left perspective view of the internals of the modulation unit 332C as well as the features of the side 1106 of the housing 1100. It is noted that the air cooling intake 1520 is preferably comprised of scalloped openings opening outward and downward to advantageously eliminate moisture drip into the housing 1100. It is noted that the openings, between the left side 1550 and the right side 1555 of the housing 1100 for cable passages between the left side 1550 and the right side 1555, include guillotine-type slides with foam or other air-blocking materials to provide a substantially air tight compartment 1525 on the right side 1555 of the housing 1100. It is noted that the large open area at the base of the enclosed portion 1525 of the housing 1100 will be partially filled with the cables from the Amphenol connectors 1420A–1420H that will then be routed through the routing openings 1300 at the bottom 1103 of the housing 1100. Other features shown in FIG. 18 are as described with respect to FIG. 17 above.

Figure 19:
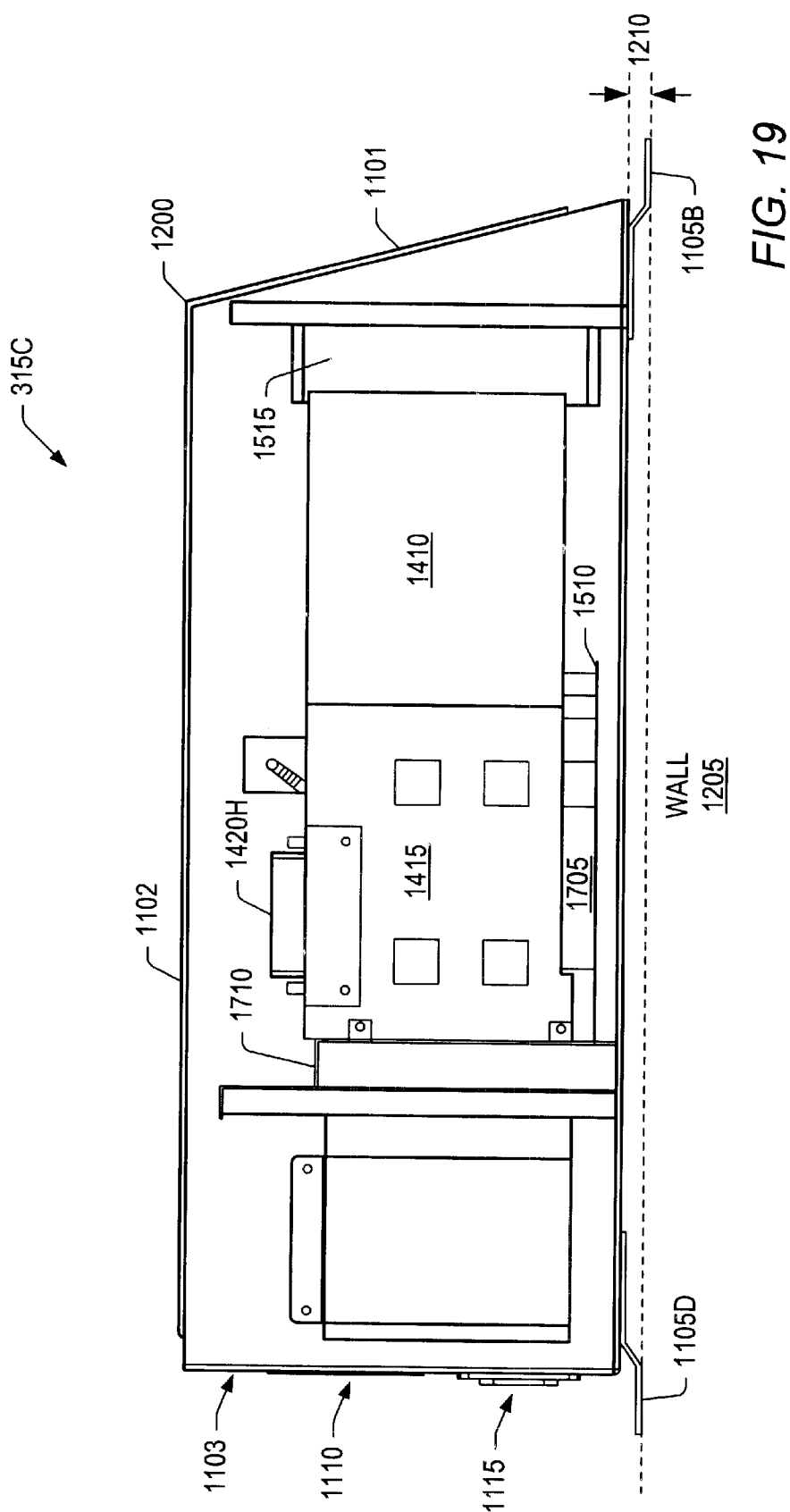
FIG. 19 is a cut-away side view of an embodiment of the alternative embodiment of a modulation unit of FIG. 16, showing a line card.

FIG. 19—Modulation Unit 332C Cut-Away Side View

FIG. 17 illustrates the side cutaway view of the modulation unit 315C as seen from the side 1104. Relative location of the slanted top 1101, the flat front side 1102, the cover 1200, the mounting brackets 1105B and 1105D, the air exhaust 1110 and the power connection 1115 at the bottom 1103, and the gap 1210 between the housing 1100 and the wall 1205 are shown for reference. Also visible in this view are storage device 1412, e.g. hard drive 1412, and line card 1415H with Amphenol connector 1420H coupled to motherboard 1510 through PCI connector 1705. Line card 1415H is secured in the housing 1100 by bracket 1710, is well know in the art for PCI cards. Note that in the illustrated embodiment, the full length smart card 1410 is seen extending beyond the end of the half-sized line card 1415H. Note that the active components are mounted on the correct side of the line card 1415H, but are not visible on the correct side of the smart card 1410.

Figure 20:
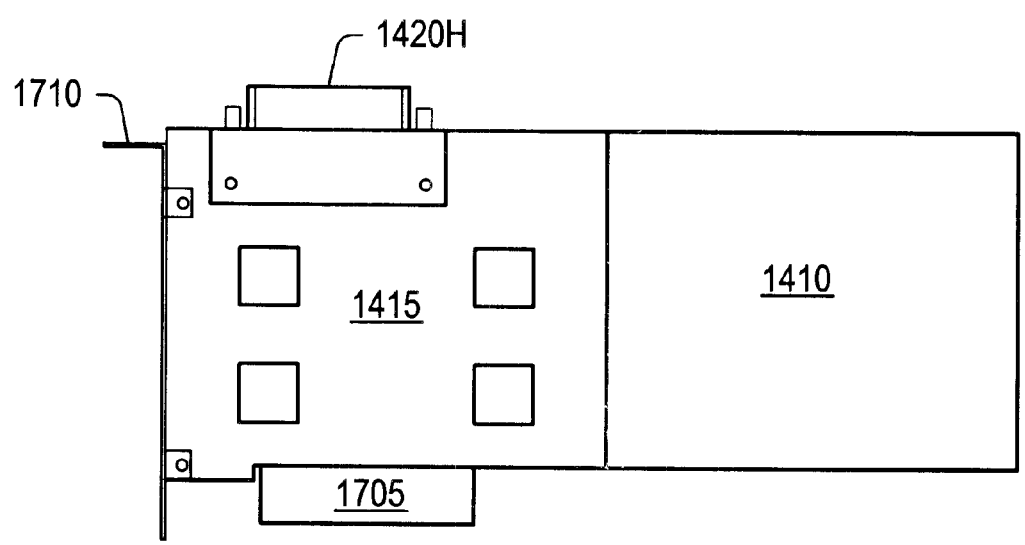
FIG. 20 is a side view of the line card of FIGS. 16 and 19.

FIG. 20—Line Card Side View

FIG. 20 illustrates the side view of an embodiment of a line card 1415 showing the relative locations of the PCI connector 1805 on the line card 1415 and the PCI connector 1705 on the motherboard 1510. Amphenol connector 1420 is shown at the top of the line card 1415. It is noted that the active devices are preferably all on the side shown in FIG. 20, the "correct" side for PCI cards.

Figure 21:
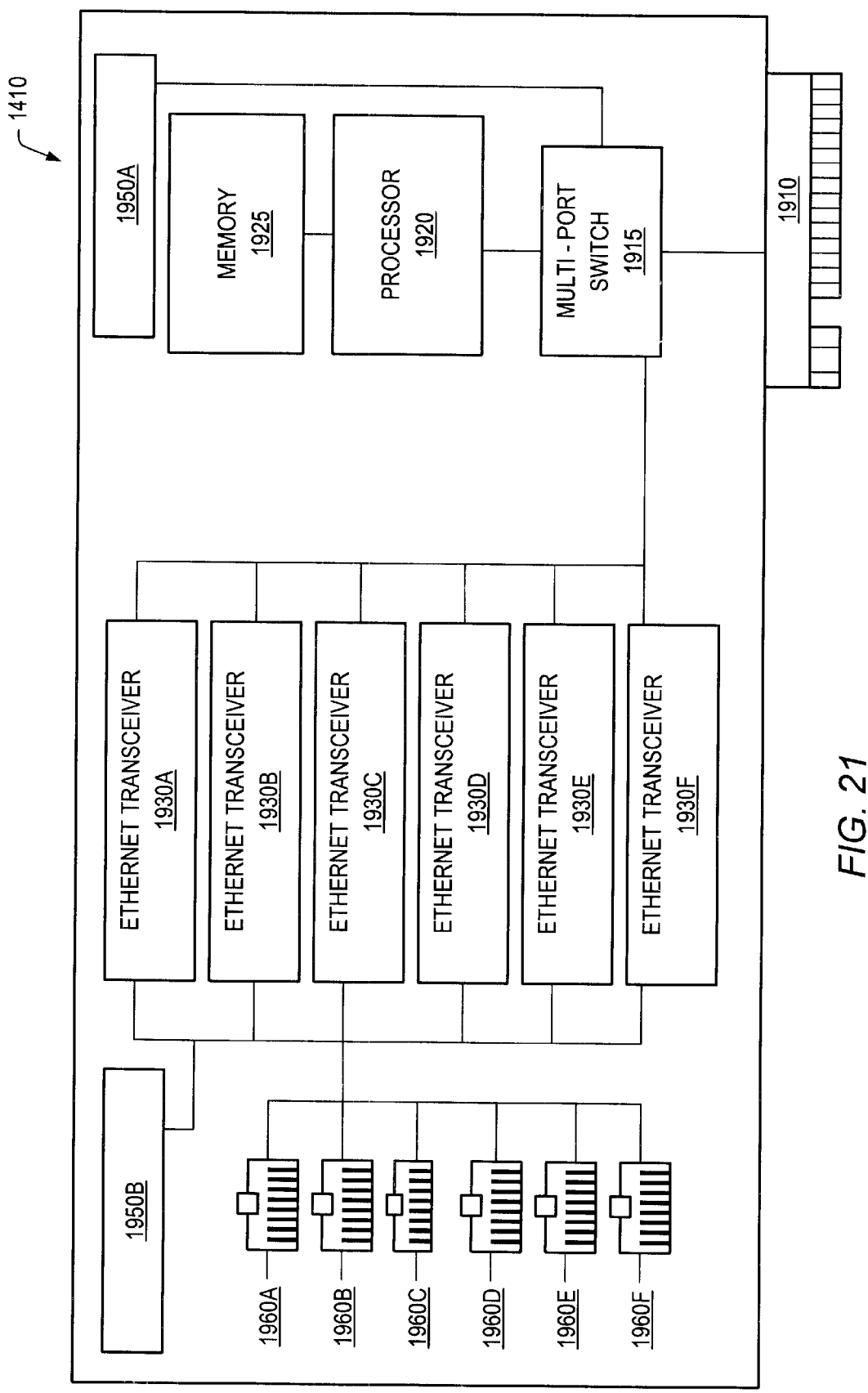
FIG. 21 is a block diagram of an embodiment of a smart line card of the alternative embodiment of a modulation unit of FIG. 16.

FIG. 21—Smart Card 1410

FIG. 21 illustrates an embodiment of a smart card 1410, that is, an intelligent line card including a processor 1920 that is operable to control one or more line cards 1415. In one embodiment, the line cards operate as a hub and the smart card operates as a switch. In another embodiment, each of the line cards 1415 operate as a switch and the smart card 1410 operates as a master switch. It is noted that active elements mounted on the side of smart card 1410 are preferably mounted on the wrong side for a PCI card. It is also noted that in the preferred embodiment, smart card 1410 is a full length PCI card. It is noted that smart card 1410 preferably uses a single network protocol, such as Ethernet, for all electronic communications occurring on smart card 1410.

As shown, FIG. 21 includes a smart card 1410 including the following: A PCI connector 1910 is operable to provide Ethernet signals to a multi-port switch 1915. The multi-port switch 1915 is coupled to a processor 1920 and a plurality of Ethernet transceivers 1930A–1930F. Multi-port switch 1915 is optionally coupled to an optical fiber transducer interface 1950A for sending optical transmissions off the smart card 1410. The Ethernet transceivers 1930A–1930F are coupled to one or more output ports, such as optical transducer port 1950B and/or a plurality of RJ-45 connectors 1960A–1960F.

In the illustrated embodiment, network signals from the network 205 are routed to smart card 1410 through either or both of optical transceiver port 1950B and/or the plurality of RJ-45 connectors 1960A–1960F. The network signals are received by the Ethernet transceivers 1930A–1930F and provided to the multi-port switch 1915. Processor 1920 which controls the operations of the devices on smart card 1410 either include or are coupled to a memory 1925. Properly addressed and formed Ethernet packets are routed by the multi-port switch 1915 to line cards via PCI connector 1910 and the motherboard, or are routed off the smart card through an I/O connector such as optical transducer port 1950A, either to the line cards 1415 or to another destination.

In a similar fashion, Ethernet data packets are received from the line cards 1415 or from another location either via the PCI connector 1910 or the optical transducer port 1950A to the multi-port switch 1915, which routes this Ethernet packet data bound for the network 205 through an appropriate Ethernet transceiver 1930 and then, preferably, out an RJ-45 connector 1960.

Figure 22A:
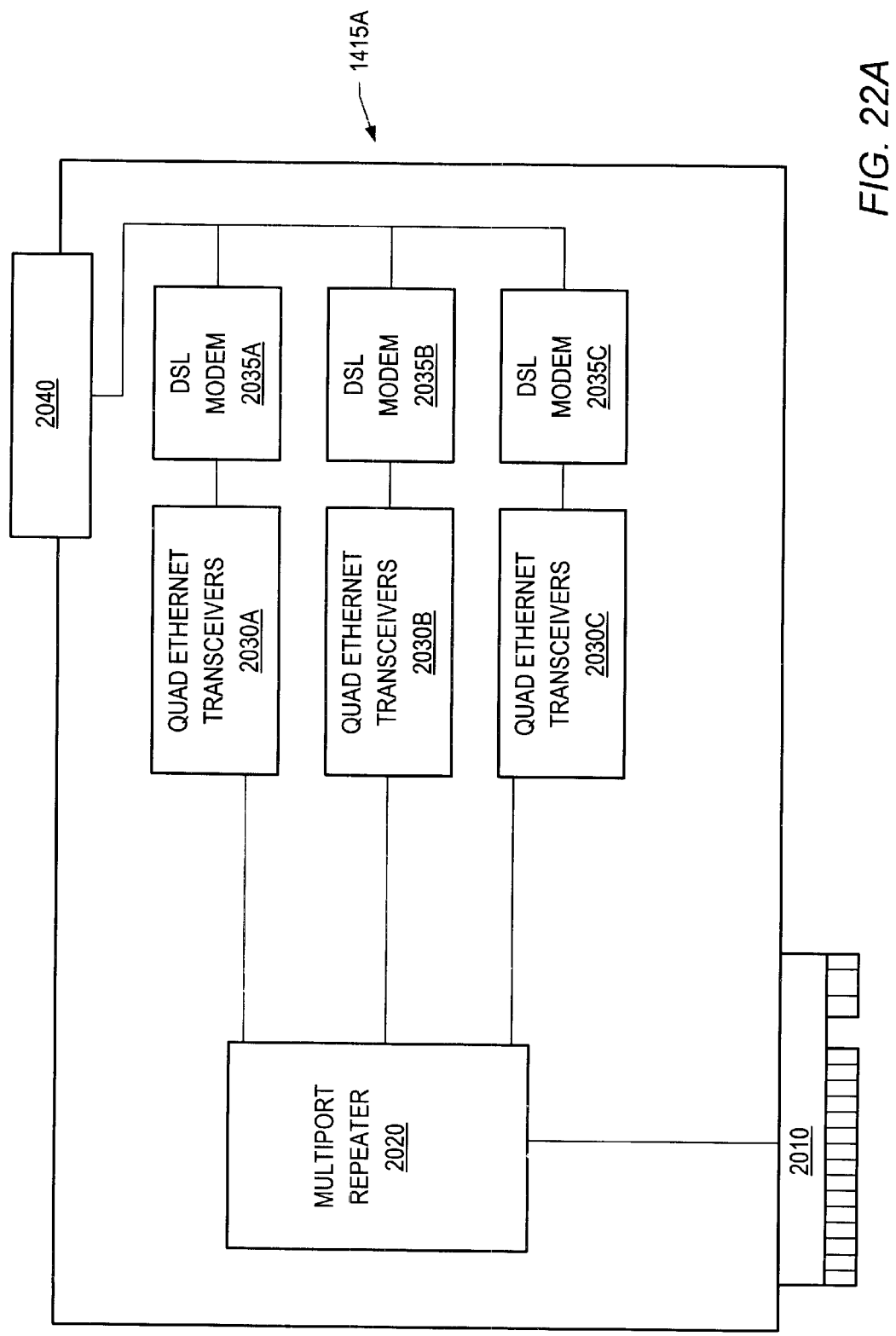
FIG. 22A is a block diagram of an embodiment of a line card of the alternative embodiment of a modulation unit of FIG. 16.

FIG. 22A—Line Card 1415A

FIG. 22A illustrates an embodiment of a line card 1415A compatible with the illustrated line interface module 332 of FIGS. 6 and 7 and the illustrated telephony device 900 of FIGS. 11 and 12. In other words, line card 1415A provides DSL signals over two-wire telephone line 120 to the end-user location.

As shown, FIG. 22A includes line card 1415A which includes the following: PCI connector 2010 couples to a motherboard and also electrically couples to a multi-port repeater 2020. Multi-port repeater 2020 couples to an Ethernet transceiver comprised in a quad internet transceiver 2030A–2030C. The quad Ethernet transceivers 2030A–2030C couple to DSL modems 2035A–2035C. Each of the DSL modems 2035 couples to two pins of an Amphenol connector 2040. The Amphenol connector is preferably located on the top of the PCI line card 1415A.

In the illustrated embodiment, POTS telephony signals over communications channel 120 are received at the amphenol connector 2040 and routed to a POTS splitter (not shown) on line card 1415A. Network data, preferably in Ethernet format, is received at PCI connector 2010 and transmitted through the multi-port repeater 2020 to the appropriate Ethernet transceiver 2030, based on the Ethernet address. Ethernet signals are received at appropriate Ethernet transceiver 2030 and provided over, preferably an MII interface, to one of the DSL modems 2035. The DSL modem is configured to accept the Ethernet data and convert the data to DSL modulated data and output the DSL modulated data onto two of the pins of the ampthenol connector 2040.

The line card 1415A operates to receive network traffic in a similar fashion. After receiving DSL modulated signals from the Amphenol connector 2040, the appropriate DSL modem 2035 demodulates the DSL modulated signals provides the demodulated data to the appropriate one of the Ethernet transceivers 2030. The Ethernet transceiver 2030 routes the data through the multi-port repeater 2020 over the PCI connector 2010 to the smart card 1410.

Figure 22B:
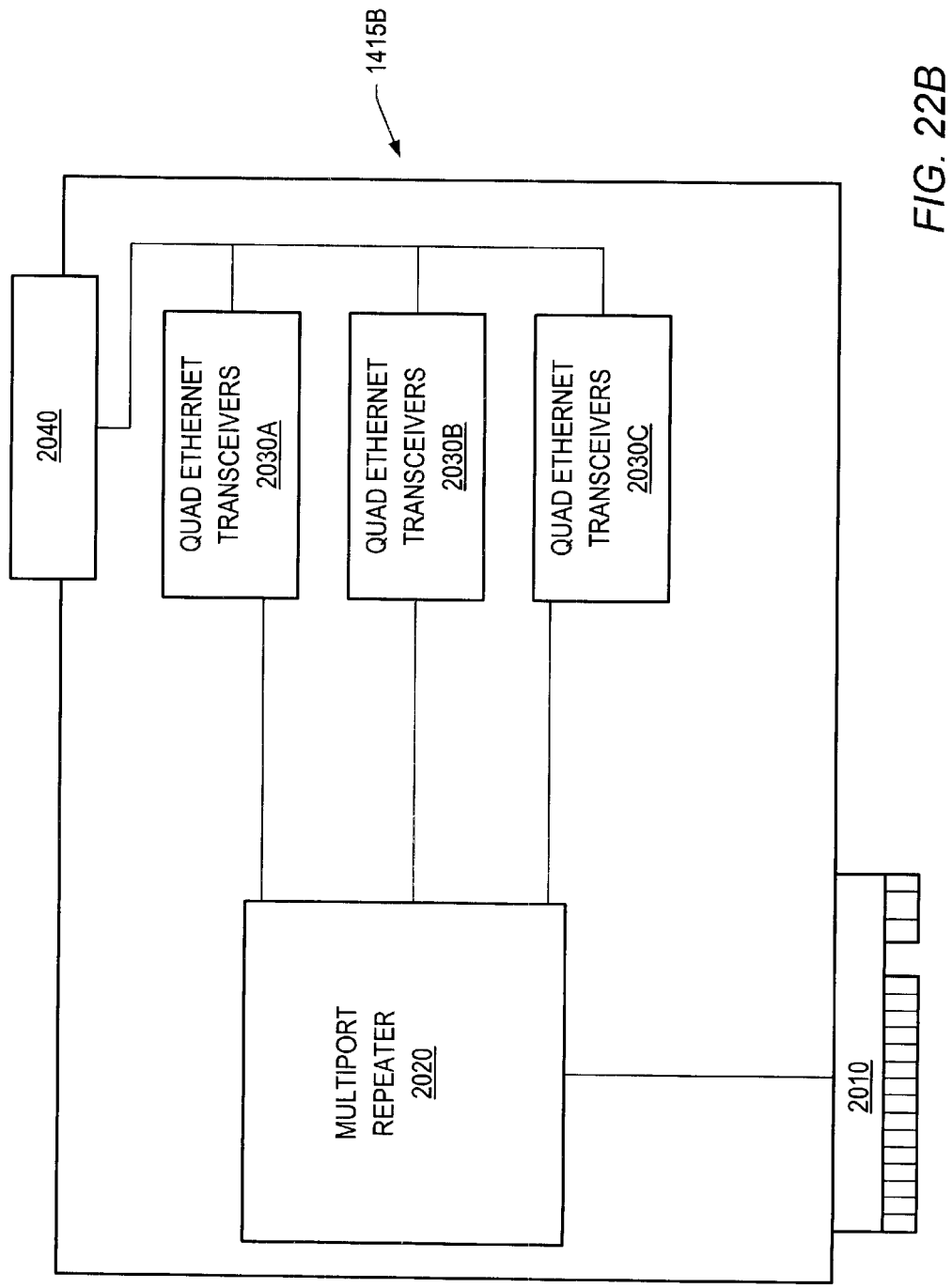
FIG. 22B is a block diagram of an embodiment of a line card of the alternative embodiment of a modulation unit of FIG. 16 which is configured to provide direct Ethernet service to a user location.

FIG. 22B—Line Card 1415B

FIG. 22B illustrates an embodiment of a line card 1415B that is used to provide Ethernet service to a user location that has high quality wires such as cat 5 available.

As shown, FIG. 22B includes line card 1415B including the following: A PCI connector 2010 configured to couple to a motherboard also electrically couples to a multi-port repeater 2020. The multi-port repeater 2020 couples to a plurality of Ethernet transceivers 2030, shown as quad Ethernet transceivers 2030A–2030C. The quad Ethernet transceivers 2030A–2030C couple to various pins of a 50 pin Amphenol connector 2040 located on the top of the line card 1415B.

Ethernet signals received from the user location are transmitted through the Amphenol connector 2040 to the appropriate Ethernet transceiver included in one of the quad Ethernet transceivers 2030. The Ethernet packets are then routed through multi-port repeater 2020 over the PCI connector 2010 to the smart card 1410. Network data bound for the user location as Ethernet data is routed from the smart card 1410 through PCI connector 2010 to the multi-port repeater 2020 to one of the Ethernet transceivers 2030 through four wires, or pins, of the Amphenol connector 2040 to the end-user location.

FIG. 23—Line Card 1415C

FIG. 23 illustrates an alternative embodiment of a line card 1415C. Line card 1415C operates as a switching line card providing each user location with a separate secure network data connection that cannot be snooped by other users located on the same physical premises who are not either connected into the actual user-location wiring or between the user-location wiring and the line card 1415C. Line card 1415C as a switching line card also operates so that each user location is its own collision domain. In other words, line card 1415C provides a completely switched hub for each user location.

As shown, FIG. 23 includes an embodiment of line card 1415C. Line card 1415C includes a connector 2010 for connecting to a motherboard. Connector 2010 is preferably mechanically equal to a PCI connector. Active components on line card 1415C are located on the "correct" side of the line card 1415C. Coupled to the electrical connections of the connector 2010 is a multi-port repeater 2020. Multi-port repeater 2020 is coupled to a plurality of multi-port switches 2025A–B. The multi-port switches 2025A–C are coupled to three quad Ethernet transceivers 2030A–2030C. The quad Ethernet transceivers 2030 are coupled to Home PNA chip sets 2036. The Home PNA chip sets 2036 are individually coupled to various pins of the Amphenol connector 2040 located at the top of the line card 1415C.

In one embodiment, telephone signals such as over line 120 may be received at the Amphenol connector 2040 on line card 1415C. A POTS splitter (not shown) routes the POTS telephone signals back to a different pair of pins of the ampthenol connector 2040 to be routed to the user location. Properly addressed and formed network data packets may be received by the line card 1415C at the PCI connector 2010. The data packets are routed to the multi-port repeater 2020 and from there through one of the multi-port switches 225 to the appropriate one of the Ethernet transceivers that are a part of the quad Ethernet transceivers 2030A–2030C. The appropriate Ethernet transceiver 2030 then routes the data packet to the appropriate HomePNA chip set 2036. The connection between the quad Ethernet transceiver 2030 and the HomePNA chip set 3036 may be, for example, MII. The HomePNA chip set converts the data packet into the HomePNA-compatible format and transmits the HomePNA formatted data over the two-wire telephone line 120 through the appropriate pins of the Amphenol connector 2040.

It is noted that the current HomePNA specification, that is Home PNA 1.0, provides for a maximum bandwidth of 1 Mbps under ideal conditions over a two-wire telephone line 120. The HomePNA 2.0 specification calls for 25 Mbps on the Ethernet side and 10 Mbps bandwidth on the HomePNA side.

It is noted that at the end-user site, the line interface module 332 embodiment or the telephony device 900 embodiment appropriate to communicate with line card 1415C must have a HomePNA-compatible chip set 620, or its equivalent, on the line interface module 332 or the telephony device 900.

Telephony Device Including Modem and Ethernet Capabilities

Figure 24:
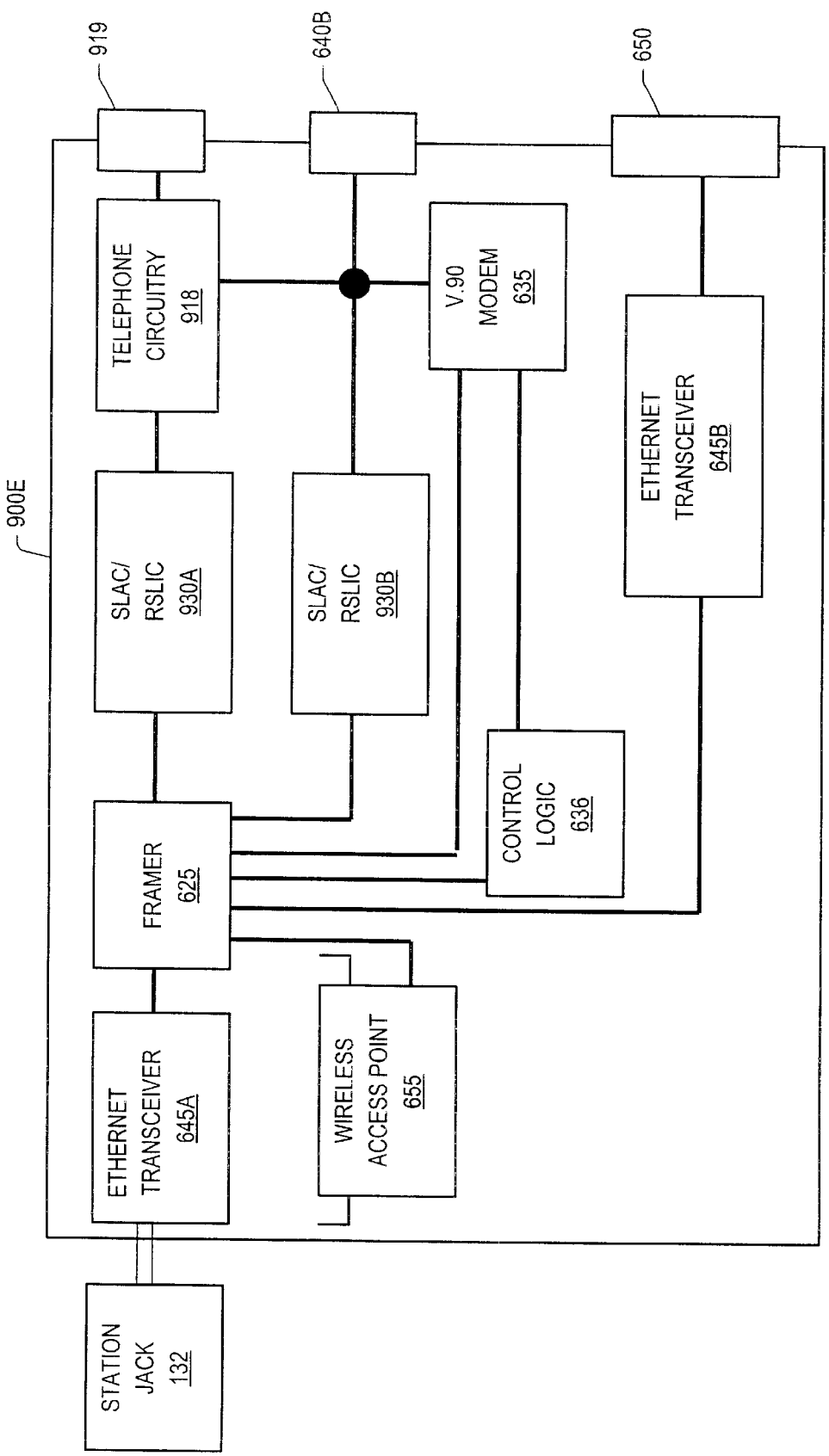
FIG. 24 is an embodiment of a telephony device including a modem and an Ethernet device.

FIG. 24 illustrates an embodiment of telephony device, referred to as 900D, which includes a modem which communicates through a network transceiver, such as an Ethernet transceiver, to a network, such as an Ethernet network.

Current technology exists which allow telephony devices or modems to connect to Ethernet networks. However, when a modem (external modem) is required to connect to an Ethernet network, the modem consumes a continuous amount of bandwidth, typically a continuous 64 k channel, regardless of actual data transmission. This degrades network operations.

In one embodiment, the present invention comprises a device, such as a telephony device or line interface module, which includes an internal modem and an Ethernet transceiver. The internal modem in the telephony device is coupled through the Ethernet transceiver to an Ethernet network. Thus the user's external modem communicates with the internal modem in the device, which in turn communicates to the network transceiver to send network packets (Ethernet or IP packets) over the network. This allows a user to only use bandwidth when needed, instead of requiring a 64 K continuous channel. Modem data is converted into IP packets and sent over the network as IP packets, thus consuming less bandwidth than transmission of modem data over the network.

A user can also connect to the network using a modem instead of requiring him to have an Ethernet card. Also, the combination of a modem and an Ethernet transceiver in the telephony device allows a reduction of bandwidth going out of the telephony device and hence a reduction in bandwidth on the network.

What is claimed is:

1. A system for providing improved telephony services on existing telephone wiring, the system comprising:

a modulation unit coupled to receive telephony signals from a PBX, the modulation unit including:

a plurality of voice inputs coupled to receive telephony signals from the PBX;

one or more data inputs for receiving data signals from a network; and a first processor coupled to receive the telephony signals from the plurality of voice inputs and the data signals from the one or more data inputs, wherein the first processor is configured to modulate the telephony signals from the PBX and the data signals from the network into an integrated data stream; and a line interface transducer, including:

at least one input for coupling to the modulation unit through the limited existing telephone wiring;

one or more telephone outputs each configured to couple to a telephone;

at least one data output configured to couple to a data processing unit; and a second processor coupled to receive the integrated data stream from the at least one input, wherein the second processor is configured to demodulate the integrated data stream into the telephony signals and the data signals, wherein the second processor is further configured to provide the telephony signals to the one or more telephone outputs, and wherein the second processor is further configured to provide the data signals to the at least one data output.

2. The system of claim 1, wherein said first processor is further configured to modulate control signals into the integrated data stream.

3. The system of claim 1, wherein the line interface transducer includes a modulation output for coupling to additional line interface transducers in other locations in said one of the locations.

4. The system of claim 1, wherein the modulation unit further comprises:

a SLAC including an analog to digital converter logic coupled to receive the analog telephony signals from the PBX, wherein the analog to digital converter logic is configured to convert the analog telephony signals into digital telephony signals;

wherein the first processor is further coupled to receive the digital telephony signals from the analog to digital converter logic.

5. The system of claim 1, wherein the first processor further comprises:

compression logic coupled to receive the integrated data stream, wherein the compression logic is configured to remove redundant information from the integrated data stream.

6. The system of claim 1, wherein the SLAC further comprises:

ring voltage detection circuits coupled to the plurality of inputs, wherein each of the ring voltage detection circuits is configured to detect a ring voltage on a respective input; and wherein the line interface transducer further comprises:

an RSLIC coupled to each of the one or more telephone outputs, wherein each RSLIC is configured to provide the ring voltage to a telephone coupled to a respective telephone output in response to a telephone call.

7. The system of claim 1, wherein each ring voltage detection circuit is further configured to notify the first processor that the ring voltage has been detected, wherein the first processor is further configured to incorporate a ring voltage notification into the integrated data stream.

8. The system of claim 7, wherein the second processor is further configured to recognize the ring voltage notification, and wherein the second processor is further configured to provide the ring voltage notification to an appropriate RLSIC.

9. The system of claim 1, wherein one or more of the first processor and the second processor include first and second digital transceivers.

10. The system of claim 1, wherein one or more of the first processor and the second processor include digital signal processors.

11. The system of claim 1, wherein the line interface transducer comprises integral components and is sized to fit within a J box.

12. The system of claim 1, wherein a modulation scheme used by the first processor is configured to provide at least two bits per hertz data throughput.

13. The system of claim 1, wherein the data block is configured to provide at least 4 million bits per second of throughput over the communications channel.

14. The system of claim 1, wherein the throughput over the communications channel is in both directions.

15. The system of claim 1, wherein the data processing unit is a computer system.

16. The system of claim 15, wherein the computer system comprises a portable computer.

17. A telephony device which provides additional telephony and/or data services on an existing telephone system, wherein the existing telephone system is comprised in a building having a plurality of rooms, wherein the existing telephone system includes limited existing telephone wiring provided from a PBX to one or more locations in each of the rooms, the telephony device comprising:

at least one input for coupling to the limited existing telephone wiring, wherein the at least one input receives telephony signals from the limited existing telephone wiring, wherein the telephony signals include a first POTS voice signal and a digital voice signal;

a POTS splitter coupled to the at least one input which receives the telephony signals and provides a first output comprising the POTS voice signal and provides a second output comprising the digital voice signal;

telephone circuitry coupled to POTS splitter which receives the POTS voice signal output from the POTS splitter, wherein the telephone circuitry performs telephony functions within the telephone;

a digital transceiver coupled to POTS splitter which receives the digital voice signal output from the POTS splitter and decodes the digital voice signal;

a subscriber line circuit coupled to the digital transceiver and to the telephone circuitry, wherein the subscriber line circuit is operable to receive the decoded digital voice signal and generate a ring signal to the telephone circuitry, wherein the subscriber line circuit is further operable to generate a second POTS voice signal in response to the decoded digital voice signal and provide the second POTS voice signal to the telephone circuitry;

a handset port coupled to the telephone circuitry, wherein the handset port is for coupling to a handset;

wherein the telephone circuitry provides one or more of the first and second POTS voice signals to the handset port.

18. A method of operating an integrated telecommunications system, wherein the integrated telecommunications system includes a PBX configured to couple to a PSTN, a modulation unit coupled to the PBX and to a data network connection, a plurality of line interface transducers coupled to the modulation unit, and a plurality of telephones each coupled to the PBX through one of the plurality of line interface transducers and through the modulation unit, wherein each of the plurality of telephones is configured to receive telephony signals through the PBX, the method comprising:

- the PBX receiving one or more telephony signals, wherein the one or more telephony signals are intended for one of the plurality of telephones;
- the PBX providing the one or more telephony signals to the modulation unit;
- the modulation unit receiving the one or more telephony signals from the PBX;
- the modulation unit providing the one or more telephony signals in a digital format to a respective one of the plurality of line interface transducers;
- the respective one of the plurality of line interface transducers receiving the one or more telephony signals from the modulation unit;
- the respective one of the plurality of line interface transducers demodulating the one or more telephony signals; and
- the respective one of the plurality of line interface transducers providing the one or more telephony signals in an analog format to the one of the plurality of telephones;
- the modulation unit receiving one or more network data signals from the data network connection, wherein the one or more network data signals are intended for a computing device connected to the respective one of the plurality of line interface transducers;
- the modulation unit integrating the one or more data signals and the one or more telephony signals into an integrated data stream; and
- the modulation unit providing the integrated data stream to the line interface unit, wherein the integrated data stream includes the one or more telephony signals and the network data signals; and
- the line interface transducer providing the network data signals in a digital format to the computing device.

19. The method of 18, further comprising:

- the modulation unit integrating control signals into the integrated data stream, wherein the integrated data stream includes the one or more telephony signals, the network data signals, and the control signals; and
- the line interface transducer receiving the control signals in the integrated data stream.

20. The method of claim 19, wherein the control signals include a ring voltage notification, wherein the line interface transducer includes an RSLIC configured to provide ring voltage to the one of the plurality of telephones, the method further comprising:

- the line interface transducer recognizing the ring voltage notification;
- the line interface transducer providing the ring voltage notification to the RSLIC;
- the RSLIC receiving the ring voltage notification; and
- the RLSIC providing the ring voltage to the one of the plurality of telephones in response to receiving the ring voltage notification from the line interface transducer.

* * * * *